United States Patent
Lee et al.

(10) Patent No.: US 12,068,798 B2
(45) Date of Patent: Aug. 20, 2024

(54) TRANSMISSION APPARATUS AND METHOD FOR TRANSMITTING SIGNAL IN WIRELESS AV SYSTEM

(71) Applicant: LG ELECTRONICS INC., Seoul (KR)

(72) Inventors: Kyuin Lee, Seoul (KR); Jaewook Song, Seoul (KR); Hyowon Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 17/796,508

(22) PCT Filed: Feb. 3, 2020

(86) PCT No.: PCT/KR2020/001556
§ 371 (c)(1),
(2) Date: Jul. 29, 2022

(87) PCT Pub. No.: WO2021/157749
PCT Pub. Date: Aug. 12, 2021

(65) Prior Publication Data
US 2023/0059959 A1    Feb. 23, 2023

(51) Int. Cl.
H04B 17/336 (2015.01)
H04B 7/0413 (2017.01)
H04N 19/423 (2014.01)
H04W 28/06 (2009.01)

(52) U.S. Cl.
CPC ......... *H04B 17/336* (2015.01); *H04B 7/0413* (2013.01); *H04N 19/423* (2014.11); *H04W 28/06* (2013.01)

(58) Field of Classification Search
CPC ............... H04B 17/336; H04B 7/0413; H04B 7/06952; H04B 7/10; H04N 19/423; H04W 28/06; H04L 1/1854
USPC ................................ 375/224, 227, 254, 260
See application file for complete search history.

(56) References Cited

U.S. PATENT DOCUMENTS

| 2003/0081692 A1 | 5/2003 | Kwan et al. |
| 2010/0128688 A1* | 5/2010 | Song ............ H04W 72/56 370/329 |
| 2015/0124901 A1* | 5/2015 | Xu .................. H04B 17/00 375/267 |
| 2018/0041292 A1 | 2/2018 | Baines |
| 2019/0097750 A1* | 3/2019 | Sandberg ........... H04L 1/0035 |
| 2019/0132089 A1 | 5/2019 | Hwang et al. |

(Continued)

FOREIGN PATENT DOCUMENTS

| KR | 10-2018-0086267 A | 7/2018 |
| KR | 10-2018-0087859 A | 8/2018 |

*Primary Examiner* — Emmanuel Bayard
(74) *Attorney, Agent, or Firm* — Birch, Stewart, Kolasch & Birch, LLP

(57) ABSTRACT

The present specification relates to a transmission apparatus and method for transmitting a signal in a wireless AV system. The transmission apparatus measures a signal to interference plus noise ratio (SINR) in a radio link. The transmission apparatus selects a modulation and coding scheme (MCS) set on the basis of the measured SINR. The transmission apparatus selects an optimal MCS from among the MCS set on the basis of the priority of a signal. The transmission apparatus transmits the signal on the basis of the optimal MCS.

14 Claims, 19 Drawing Sheets

(56) References Cited

U.S. PATENT DOCUMENTS

2020/0099596 A1\* 3/2020 Sun ................... H04L 43/0823
2021/0160713 A1\* 5/2021 Yang .................. H04B 7/0632
2024/0080690 A1\* 3/2024 Yang .................. H04L 27/2627

\* cited by examiner (A)

| Mode | MCS | Mod | Code rate | MAC T.put [Mbps] (Effective T.put) | Required SNR [dB] @PER 1% | |
|---|---|---|---|---|---|---|
| | | | | | LR (LOS) | LR (NLOS) |
| Control | 0 | DBPSK | 1/2 | 26.6 | -13 | -7 |
| SC | 1 | BPSK | 1/2 | 1430 | 2 | 9 |
| | 2 | BPSK | 1/2 | 2860 | 3.5 | 11 |
| | 3 | BPSK | 5/8 | 3570 | 5 | 12.5 |
| | 4 | BPSK | 3/4 | 4290 | 6 | 14 |
| | 5 | BPSK | 13/16 | 4650 | 7 | 15.5 |
| | 6 | BPSK | 7/8 | 5010 | 8 | 17.5 |
| | 7 | QPSK | 1/2 | 5720 | 6.5 | 14 |
| | 8 | QPSK | 5/8 | 7160 | 8 | 16 |
| | 9 | QPSK | 3/4 | 8590 | 9 | 18 |
| | 10 | QPSK | 13/16 | 9300 | 10 | 19 |
| | 11 | QPSK | 7/8 | 10010 | 11 | 20.5 |
| | 12 | 16-QAM | 1/2 | 11440 | 12.5 | 21.5 |
| | 13 | 16-QAM | 5/8 | 14300 | 14 | 24 |
| | 14 | 16-QAM | 3/4 | 17180 | 15.5 | 26 |
| | 15 | 16-QAM | 13/16 | 18610 | 16.5 | 28 |
| | 16 | 16-QAM | 7/8 | 20020 | 17.5 | 30 |
| | 17 | 64-QAM | 1/2 | 17180 | 17 | 28 |
| | 18 | 64-QAM | 5/8 | 21480 | 19 | 31 |
| | 19 | 64-QAM | 3/4 | 25780 | 21.5 | 34 |
| | 20 | 64-QAM | 13/16 | 27920 | 22.5 | 36 |
| | 21 | 64-QAM | 7/8 | 30070 | 23.5 | 37 |

FIG. 16

| k | Data Rate (per complex symbol) | Code (stream0) | MCS (stream1) |
|---|---|---|---|
| 0 | 10.5 | 21 | 21 |
| 1 | 9.75 | 20 | 20 |
| 2 | 9 | 19 | 19 |
| 3 | 8.75 | 21 | 16 |
| 4 | 8.125 | 20 | 15 |
| 5 | 7.5 | 18 | 18 |
| 6 | 7 | 19 | 14 |
| 7 | 7 | 16 | 16 |
| 8 | 6.5 | 21 | 11 |
| 9 | 6.5 | 15 | 15 |
| 10 | 6.25 | 20 | 10 |
| 11 | 6.25 | 18 | 13 |
| 12 | 6.125 | 21 | 6 |
| 13 | 6 | 17 | 17 |
| 14 | 6 | 14 | 14 |
| 15 | 5.6875 | 19 | 9 |
| 16 | 5.6875 | 20 | 5 |
| 17 | 5.25 | 16 | 11 |
| 18 | 5.25 | 19 | 4 |

When there are multiple MCS combination sets at the same data rate
The method of choosing the optimal value should be further considered

| k | Data Rate (per complex symbol) | Code (stream0) | MCS (stream1) |
|---|---|---|---|
| 19 | 5 | 13 | 13 |
| 20 | 5 | 17 | 12 |
| 21 | 5 | 18 | 8 |
| 22 | 4.875 | 15 | 10 |
| 23 | 4.5 | 14 | 9 |
| 24 | 4.375 | 16 | 6 |
| 25 | 4.375 | 18 | 3 |
| 26 | 4.0625 | 15 | 5 |
| 27 | 4 | 12 | 12 |
| 28 | 4 | 17 | 7 |
| 29 | 3.75 | 13 | 8 |
| 30 | 3.75 | 14 | 4 |
| 31 | 3.5 | 11 | 11 |
| 32 | 3.5 | 17 | 2 |
| 33 | 3.25 | 10 | 10 |
| 34 | 3.25 | 17 | 1 |
| 35 | 3.125 | 13 | 3 |
| 36 | 3 | 9 | 9 |
| 37 | 3 | 12 | 7 |

| k | Data Rate (per complex symbol) | Code (stream0) | MCS (stream1) |
|---|---|---|---|
| 38 | 2.625 | 11 | 6 |
| 39 | 2.5 | 8 | 8 |
| 40 | 2.5 | 12 | 2 |
| 41 | 2.4375 | 10 | 5 |
| 42 | 2.25 | 9 | 4 |
| 43 | 2.25 | 12 | 1 |
| 44 | 2 | 7 | 7 |
| 45 | 1.875 | 8 | 3 |
| 46 | 1.75 | 6 | 6 |
| 47 | 1.625 | 5 | 5 |
| 48 | 1.5 | 4 | 4 |
| 49 | 1.5 | 7 | 2 |
| 50 | 1.25 | 3 | 3 |
| 51 | 1 | 7 | 1 |
| 52 | 1 | 2 | 2 |
| 53 | 0.75 | 2 | 1 |
| 54 | 0.5 | 1 | 1 |

TRANSMISSION APPARATUS AND METHOD FOR TRANSMITTING SIGNAL IN WIRELESS AV SYSTEM

CROSS REFERENCE TO RELATED APPLICATIONS

This application is the National Phase of PCT International Application No. PCT/KR2020/001556, filed on Feb. 3, 2020, which is hereby expressly incorporated by reference into the present application.

BACKGROUND OF THE DISCLOSURE

Field of the Disclosure

The present disclosure relates to a wireless audio/video (AV) system, and more particularly, to a transmission apparatus and method for transmitting a signal in a wireless AV system.

Related Art

Recently, there is a growing demand for high-resolution and high-quality pictures such as a high definition (HD) picture and an ultra-high definition (MD) picture in various fields. The higher the resolution and quality of picture data, the greater the amount of information of bits to be transmitted relative to the existing picture data. Therefore, transmission cost may increase when the picture data is transmitted using a medium such as the existing wired/wireless broadband line.

Meanwhile, the institute of electrical and electronics engineers (IEEE) 802.11ad standard is a high-speed wireless communication standard which operates in a band of at least 60 GHz. A signal reachable range is about 10 meters, but a throughput of at least 6 Gbps may be supported. The IEEE 802.11ad standard provides a beamforming training process for antenna beam alignment. IEEE 802.11ay is a next-generation standard which is under development for the purpose of a throughput of at least 20 Gbps based on the IEEE 802.11ad. 141 Multiple access and communication between a plurality of unspecified devices are premised in case of the existing standard such as a series of IEEE 802.11 ad or ay. Therefore, a data format or frame format used by a medium access control (MAC) layer or physical layer of the series of WEE 802.11ad or ay includes a plurality of control information fields for controlling and managing resources and operations of a plurality of devices. However, in an application of a wireless AV system to which the present disclosure belongs, wireless communication in a situation where peer devices are specified is premised in most cases (e.g., communication between a wireless set-top box and a wireless TV).

In a wireless AV system, a data transmitting device and/or data receiving device may be equipped with multiple antennas. Most particularly, in case the data transmitting device and/or data receiving device use(s) a polarization antenna, orthogonality among the antennas may be ensured. When performing multiple input multiple output (MIMO) transmission through a polarization antenna, since inter-stream interference (ISI) may be removed, optimal MIMO performance can be ensured.

SUMMARY OF THE DISCLOSURE

Technical Objects

The present specification proposes a transmission apparatus and method for transmitting a signal in a wireless AV system.

Technical Solutions

This embodiment proposes a transmission apparatus and method for transmitting a wireless AV signal.

This embodiment proposes a method for compensating for image quality degradation according to a wireless environment in wireless AV (Audio/Video) transmission. Specifically, this embodiment proposes a method of setting priorities according to quality data characteristics and transmitting signals by applying different MCSs according to the set priorities. Accordingly, it is possible to minimize the deterioration of image quality.

The transmitting device may be a TV body, and the receiving device may be a TV panel. That is, this embodiment describes wireless AV transmission between the TV body and the TV panel.

The transmitting device and the receiving device may include a memory, a communication circuit forming a radio link, and a processor controlling the memory and the communication circuit. The processor may perform the following operations.

The processor measures a Signal to Interference plus Noise Ratio (SINR) of the radio link.

The processor selects a Modulation and Coding Scheme (MCS) set based on the measured SINR.

The processor selects an optimal MCS from among the MCS set based on a priority of the signal.

The processor transmits the signal based on the optimal MCS.

Effects of the Disclosure

According to the proposed embodiment, there is an effect that data robustness can be increased by applying a variable MCS in consideration of priority when transmitting a signal in the wireless AV system. In addition, there is an effect that the probability of loss of important data can be reduced by increasing the transmission period of high-priority data.

BRIEF DESCRIPTION OF THE DRAWINGS

FIG. 13 shows a table for selecting an MCS in consideration of the SINR situation of a radio link.

FIG. 16 shows an example of MCS combination for default MCS selection.

DESCRIPTION OF EXEMPLARY EMBODIMENTS

Hereinafter, embodiments of a wireless data transmitting device and method and a wireless data receiving device and method are described in detail according to the present disclosure, but the present disclosure is not limited thereto. Features of the present disclosure are described by the illustrated embodiments. However, functions and structures identical or equivalent to the embodiments described in the present specification are included within the spirit and scope of the present disclosure, and may also be achieved by other intended embodiments. Throughout the present specification, like reference numbers indicate like parts or features. Hereinafter, embodiments of the present disclosure will be described in detail with reference to the accompanying drawings.

Recently, a design of a display device such as a TV is becoming more important, and a display panel is gradually becoming thinner with the development of a display panel technology such as OLED. However, there is a limitation in producing and designing a thinner display panel due to a basic thickness of a driving circuit which drives the display panel. Therefore, there is a growing attention for a technique in which the remaining components other than inevitable components to be physically and electrically coupled with the display panel are separated from the display panel and provided in a separate device (hereinafter, referred to as a mainframe device). In this case, the mainframe device and the display device may be configured to mutually exchange a video signal and an audio signal, based on wireless communication. The present disclosure relates to a wireless AV system or wireless display system of which a mainframe device and a display device are physically and/or electrically independent as described above and which mutually reproduces media, based on wireless communication, FIG. 1 is a block diagram of a wireless AV system according to an embodiment.

Figure 1:
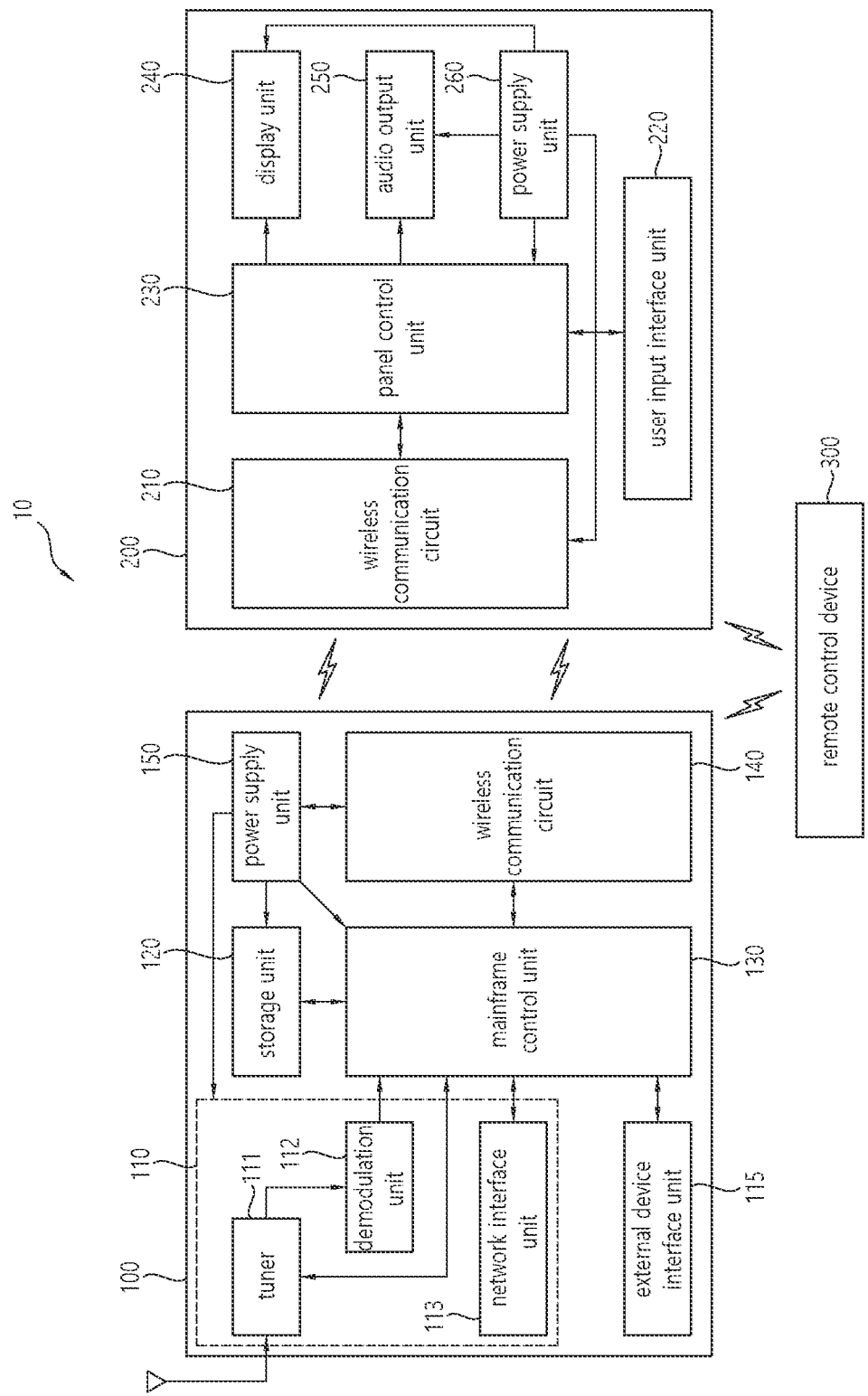
FIG. 1 is a block diagram of a wireless display system according to an embodiment.

Referring to FIG. 1, a wireless AV system 10 may include a mainframe device 100, a display device 200, and a remote control device 300.

The mainframe device 100 may perform an operation of receiving a wired/wireless-type external signal related to audios, videos, pictures, images, multimedia, or at least one combination thereof, generating a data stream or bit stream by processing the received external signal in various manners, and transmitting it to the display device 200 through a wireless interface.

In order to perform such an operation, the mainframe device 100 may include an external signal receiving unit 110, an external device interface unit 115, a storage unit 120, a mainframe control unit 130, a wireless communication circuit 140, and a power supply unit 150.

The external signal receiving unit may include a tuner 111, a demodulation unit 112, and a network interface unit 113.

The tuner 111 receives a wired/wireless-type external signal related to audios, videos, pictures, images, multimedia, or at least one combination thereof. For example, the tuner 111 may select a specific broadcast channel according to a channel selection command and receive a broadcast signal for the selected specific broadcast channel.

The demodulation unit 112 may separate the received external signal into a video signal, an image signal, a picture signal, an audio signal, a data signal related to a broadcast program, or the like, and may restore the separated video signal, image signal, picture signal, audio signal, data signal related to the broadcast program, or the like into a format which can be output.

The external device interface unit 115 may receive an application or an application list in an adjacent external device and transmit it to the mainframe control unit 130 or the storage unit 120.

The external device interface unit 115 may provide a connection path between the mainframe device 100 and the external device. The external device interface unit 115 may receive one or more of audios, videos, pictures, images, multimedia, and at least one combination thereof output from the external device coupled in a wireless or wired manner to the mainframe device 100, and may transfer it to the mainframe control unit 130. The external device interface unit 115 may include a plurality of external input terminals. The plurality of external input terminals may include an RGB terminal, one or more high definition multimedia interface (HDMI) terminals, and a component terminal.

The external device that can be coupled with the external device interface unit 115 may be any one of a set-top box, a Blu-ray player, a DVD player, a game device, a sound bar, smartphone, a PC, a USB memory, and a home theater, hut this is for exemplary purposes only.

The network interface unit 113 may provide an interface for coupling the mainframe device 100 to a wired/wireless network including an Internet network. The network interface unit 113 may transmit or receive data with another user or another electronic device through an accessed network or another network linked to the accessed network.

In addition, part of content data stored in the mainframe device 100 may be transmitted to a selected user or a selected electronic device among the pre-stored other users or other electronic devices.

The network interface unit 113 may access a predetermined webpage through the accessed network or another network linked to the accessed network. That is, data can be transmitted or received with a corresponding server by accessing the predetermined webpage through the network.

In addition, the network interface unit 113 may receive content or data provided by a content provider or a network operator. That is, the network interface unit 113 may receive content such as movies, advertisements, games, VODs, broadcast signals, or the like provided from the content provider or the network operator through the network, and information related to the content.

In addition, the network interface unit 113 may receive update information and update files of firmware provided by the network operator, and may transmit data to the Internet or content provider or the network operator.

The network interface unit 113 may select and receive a desired application among applications open to the public through the network.

The storage unit 120 may store a program for processing and controlling each signal in the mainframe control unit 130, and may store signal-processed video, audio, or data signals.

In addition, the storage unit 120 may perform a function for temporarily storing a picture, audio, or data signal input from the external device interface unit 115 or the network interface unit 113, and may store information related to a predetermined image through a channel memory function.

The storage unit 120 may store an application or an application list input from the external device interface unit 115 or the network interface unit 113.

The mainframe control unit 130 may control the mainframe device 100 by a user command or internal program input through the remote control device 300, and may access the network to download an application desired by a user or an application list into the mainframe device 100.

The mainframe control unit 130 may allow channel information or the like selected by the user to be output through the display device 200 or an audio output unit 250 together with the processed picture or audio signal.

In addition, the mainframe control unit 130 may allow a picture signal or an audio signal, provided from an external device, for example, a camera or a camcorder, input through the external device interface unit 115, to be output through the display device 200 or the audio output unit 250, according to an external device picture playback command received through the remote control device 300.

In addition, the mainframe control unit 130 may provide control to reproduce content stored in the storage unit 120, broadcast content received, and external input content which is input from the outside. The content may have various formats such as a broadcast picture, an external input picture, an audio file, a still picture, an accessed web screen, a text file, or the like.

The mainframe control unit 130 may perform an operation of decoding data or the like related to a video, image, picture, audio, and broadcast program input through the demodulation unit 112, the external device interface unit 115, or the storage unit 120, encoding again the decoded data in accordance with an encoding/decoding scheme supported by the display device 200, generating a data stream or a bit stream by processing data through various picture/audio processing schemes such as compression or encoding so that the encoded data is transmitted through a wireless channel, and transmitting the generated data stream or bit stream to the display device 200 through the wireless communication circuit 40. According to an embodiment, the mainframe control unit 130 may transmit the decoded data again to the display device 200 directly through the wireless communication circuit 140 by bypassing the decoded data without having to encode it in accordance with the encoding/decoding scheme supported by the display device 200.

In addition, the mainframe control unit 130 may be configured to implement functions, procedures, and/or methods of a processor 1130 of a wireless data transmitting device 1100 described in each embodiment of the present specification. Layers of a wireless interface protocol may be implemented in the processor 1130.

The wireless communication circuit 140 is operatively coupled with the mainframe control unit 130 to receive a data stream or a bit stream from the mainframe control unit 130, generates a wireless stream by encoding and/or modulating the data stream or the bit stream so that it can be transmitted through a wireless channel, and transmits the wireless stream to the display device 200. The wireless communication circuit 140 establishes a wireless link, and the mainframe device 100 and the display device 200 are coupled by means of the wireless link. The wireless communication circuit 140 may be implemented based on various wireless communication schemes, for example, short-range wireless communication such as WI-FI, Bluetooth, NFC, and RFID, or a mobile communication network (e.g., 3G, 4G, 5G cellular network, etc.). For example, the wireless communication circuit 140 may perform communication using a communication protocol such as the IEEE 802.11 series standard.

The power supply unit 150 supplies power to the external signal receiving unit 110, the external device interface unit 115, the storage unit 120, the mainframe control unit 130, and the wireless communication circuit 140. A scheme in which the power supply unit 150 receives power from the outside may include a terminal scheme and a wireless scheme. When the power supply unit 150 receives power in a wireless manner, the power supply unit 150 may include a separate component for wirelessly receiving power. For example, the power supply unit 150 may include a power pick-up unit configured to receive wireless power by magnetic coupling with an external wireless power transmitting device, and a separate communication and control unit configured to perform communication with the wireless power transmitting device and control transmission and reception of wireless power.

The wireless communication circuit 140 may also be wirelessly coupled with the remote control device 300 to transfer a signal input by the user to the mainframe control unit 130 or transfer a signal from the mainframe control unit 130 to the user. For example, according to various communication schemes such as Bluetooth, ultra wideband (WB), Zigbee, a radio frequency (RF) communication scheme, or an infra-red (IR) communication scheme, the wireless communication circuit 140 may receive from the remote control device 300 a control signal such as power on/off, screen setting, or the like of the mainframe device 100, or may transmit the control signal from the mainframe control unit 130 to the remote control device 300.

In addition, the wireless communication circuit 140 may transfer to the mainframe control unit 130 a control signal input from a local key (not shown) such as a power key, a volume key, a set value, or the like.

Next, the display device 200 may perform a display or audio output operation after processing a wireless stream received from the mainframe device 100 through a wireless interface according to a reverse process of signal processing performed by the mainframe device 100. In order to perform such an operation, the display device 200 may include a wireless communication circuit 210, a user input interface unit 220, a panel control unit 230, a display unit 240, an audio output unit 250, and a power supply unit 260.

The wireless communication circuit 210 is coupled with the wireless communication circuit 140 of the mainframe device 100 through a wireless link to perform wireless communication with the wireless communication circuit 130 of the mainframe device 100. Specifically, the wireless communication circuit 210 receives a wireless stream from the wireless communication circuit 140 of the mainframe device 100, demodulates the wireless stream, and transmits the demodulated wireless stream to the panel controller 230. The wireless communication circuit 210 may be implemented based on various wireless communication schemes, for example, short-range wireless communication such as WI-FI, Bluetooth, NFC, and RFID, or a mobile communication network (e.g., 3G, 4G, 5G cellular network, etc.). For example, the wireless communication circuit 210 may perform communication using a communication protocol such as the IEEE 802.11 series standard, e.g., IEEE 802.11ay.

The panel control unit 230 decodes a signal demodulated by the wireless communication circuit 210 to restore a bit stream or a data stream. In this case, when the bit stream or data stream is compressed, the panel controller 230 performs an operation of decompressing or restoring the bit stream or data stream, and then outputs signals such as a video signal, an image signal, a picture signal, an audio signal, and a data signal related to a broadcast program. The signals may be sent to the display unit 240, the audio output unit 250, and the user input interface unit 220.

The video signal, the picture signal, the image signal, or the like may be input to the display unit 240 and may be displayed as a picture corresponding to the picture signal in addition, a picture signal processed by the panel control unit 230 may be transmitted again to the mainframe device 100 through the wireless communication circuit 210, and may be input to an external output device through the external device interface unit 115 of the mainframe device 100.

An audio signal processed by the panel controller 230 may be output to the audio output unit 250. In addition, the audio signal processed by the panel control unit 230 may be transmitted again to the mainframe device 100 through the wireless communication circuit 210, and may be input to the external output device through the external device interface unit 115 of the mainframe device 100.

Meanwhile, the panel control unit 230 may control the display unit 240 to display a picture, for example, may provide control such that a broadcast picture input through the tuner 111, an external input picture input through the external device interface unit 115, a picture input through the network interface unit, or a picture stored in the storage unit 120 is displayed on the display unit 240, in this case, the picture displayed on the display unit 240 may be a still picture or a moving picture, and may be a 2D picture or a 3D picture.

The panel controller 230 may be configured to implement functions, procedures, and/or methods of a processor 1230 of a wireless data receiving device 1200 described in each embodiment of the present specification. In addition, the processor 1230 may be configured to implement functions, procedures, and/or methods of the wireless data receiving device 1200 described in each embodiment of the present specification.

The user input interface 220 may transfer a signal input by the user to the panel control unit 230 or transfer a signal from the panel control unit 230 to the user. For example, according to various communication schemes such as Bluetooth, ultra wideband (WB), Zigbee, a radio frequency (RF) communication scheme, or an infra-red (IR) communication scheme, the user input interface unit 220 may receive from the remote control device 300 a control signal such as power on/off, screen setting, or the like of the display device 200, or may transmit the control signal from the panel control unit 230 to the remote control device 300.

In addition, the user input interface unit 220 may transfer to the panel control unit 230 a control signal input from a local key (not shown) such as a power key, a volume key, a set value, or the like.

The power supply unit 150 supplies power to the wireless communication circuit 210, the user unit interface unit 220, the panel control unit 230, the display unit 240, and the audio output unit 250. A scheme in which the power supply unit 260 receives power from the outside may include a terminal scheme and a wireless scheme. When the power supply unit 260 receives power in a wireless manner, the power supply unit 260 may include a separate component for wirelessly receiving power. For example, the power supply unit 260 may include a power pick-up unit configured to receive wireless power by magnetic coupling with an external wireless power transmitting device, and a separate communication and control unit configured to perform communication with the wireless power transmitting device and control transmission and reception of wireless power.

The remote control device 300 performs an operation in which the mainframe device 100 and/or the display device 200 remotely control power on/off, channel selection, screen setting, or the like, and may be referred to as a remote controller.

Meanwhile, since the mainframe device 100 and display device 200 of FIG. 1 are only one embodiment of the present specification, some of components illustrated herein may be integrated, added, or omitted according to specifications of the mainframe device 100 and display device 200 actually implemented. That is, if necessary, two or more components may be combined into one component, or one component may be subdivided into two or more components. In addition, a function performed in each block is for explaining the embodiments of the present disclosure, and a specific operation or device does not limit the scope of the present disclosure.

According to another embodiment of the present disclosure, unlike in FIG. 1, the mainframe device 100 does not include the tuner 111 and the demodulation unit 112, and may receive a picture through the network interface unit 113 or the external device interface unit 115 to reproduce the picture.

For example, the mainframe device 100 may be implemented by being divided into a picture processing device such as a set-top box or the like for receiving a broadcast signal or content according to various network services and a content reproducing device for reproducing content input from the picture processing device.

In this case, a method of operating the wireless AV system 10 according to an embodiment of the present disclosure to be described below may be performed by not only the mainframe device 100 and the display device 200 as described with reference to FIG. 1 but also any one of a picture processing device such as the separate set-top box or the like and a content reproducing device having the audio output unit 250.

In terms of system input/output, the mainframe device 100 may be referred to as a wireless source device which provides a source wirelessly, and the display device 200 may be referred to as a wireless sink device which receives the source wirelessly. The wireless source device and the wireless sink device may implement wireless display (WD) communication techniques compatible with standards such as wireless HD wireless home digital interface (W IDI), WiGig, wireless USB, and Wi-Fi display (WFD) (also known as Miracast).

In terms of an application, the mainframe device 100 may be integrated in a form of constituting part of a wireless set-top box, a wireless gaining console, a wireless digital video disk (DVD) player, and a wireless writer. In this case, the mainframe device 100 may be provided in a form of a wireless communication module or chip. In addition, the display device 200 may be integrated in a form of constituting part of a user device or electronic device (e.g., a wireless TV, a wireless monitor, a wireless projector, a wireless printer, a wireless vehicle dashboard display, a wearable device, an augmented reality (AR) headset, a virtual reality (VR) headset, etc.) having a display panel for displaying an image or a video. In this case, the display device 200 may be provided in a form of a wireless communication module or chip.

The mainframe device 100 and the display device 200 may be integrated in a form of constituting part of a mobile device. For example, the mainframe device 100 and the display device 200 may be integrated into a mobile terminal including smartphones, smart pads, or tablets, or other types of wireless communication devices, portable computers having wireless communication cards, a personal digital assistant (PDA), a portable media player, a digital image capturing device such as a camera or a camcorder, or other flash memory devices having wireless communication capabilities. In this case, the mainframe device 100 and the display device 200 may be provided in a form of a wireless communication module or chip.

A smartphone user may stream or mirror a video or audio output by a user's smartphone, tablet, or other computer devices to another device such as a television or projector capable of providing a higher resolution display or other enhanced user experiences.

As described above, the mainframe device 100 may perform an operation of receiving a wired/wireless-type external signal related to audios, videos, pictures, images, multimedia, or at least one combination thereof, generating a data stream or bit stream by processing the received external signal in various manners, and transmitting it to the display device 200 through a wireless interface.

Hereinafter, the picture/video/audio data transmitted through the wireless interface is collectively referred to as wireless data. That is, the mainframe device 100 may communicate wirelessly with the display device 200 and transmit wireless data. Therefore, in terms of a wireless data transceiving system 1000, the mainframe device 100 may be referred to as the wireless data transmitting device 1100, and the display device 200 may be referred to as the wireless data receiving device 1200. Hereinafter, the present disclosure will be described in greater detail in terms of the wireless data transceiving system 1000. First, a detailed block diagram of the wireless data transceiving system 1000 is disclosed.

Figure 2:
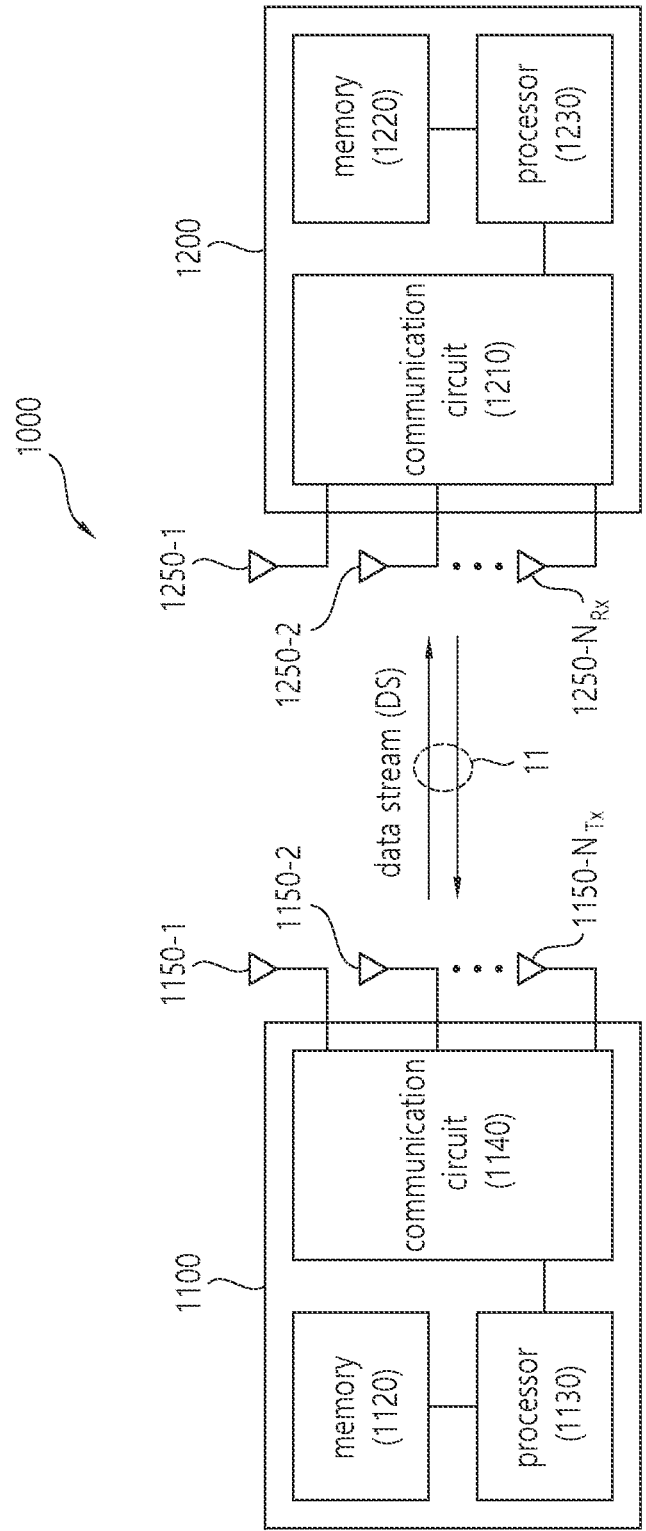
FIG. 2 is a block diagram of a wireless data transceiving system according to an embodiment.

FIG. 2 is a block diagram of a wireless data transceiving system according to an embodiment.

Referring to FIG. 2, the wireless data transceiving system 1000 refers to a system for transmitting and receiving a data stream wirelessly, and includes the wireless data transmitting device 1100 and at least one wireless data receiving device 1200. The wireless data transmitting device 1100 is communicatively coupled with the at least one wireless data receiving device 1200.

In terms of a wireless communication system (i.e., WLAN, WiFi), the wireless data transmitting device 1100 may be referred to as an AP or a personal basic service set control point (PCP) station, and the wireless data receiving device 1200 may be referred to as an STA or a non-PCP station.

In terms of input/output of a data stream, the wireless data transmitting device 1100 may be referred to as a wireless source device which provides a source wirelessly, and the wireless data receiving device 1200 may be referred to as a wireless sink device which receives the source wirelessly. The wireless source device and the wireless sink device may implement wireless display (WD) communication techniques compatible with standards such as wireless HD, wireless home digital interface (WHDI), WiGig, wireless USB and Wi-Fi Display (WFD) (also known as Miracast).

In terms of an application, the wireless data transmitting device 1100 may be integrated in a form of constituting part of a wireless set-top box, a wireless gaming console, a wireless digital video disk (DVD) player, and a wireless writer. In this case, the wireless data transmitting device 1100 may be provided in a form of a wireless communication module or chip. In addition, the wireless data receiving device 1200 may be integrated in a form of constituting part of a user device or electronic device (e.g., a wireless TV, a wireless monitor, a wireless projector, a wireless printer, a wireless vehicle dashboard display, a wearable device, an augmented reality (AR) headset, a virtual reality (VR) headset, etc.) having a display panel for displaying an image or a video. In this case, the wireless data receiving device 1200 may be provided in a form of a wireless communication module or chip.

The wireless data transmitting device 1100 and the wireless data receiving device 1200 may be integrated in a form of constituting part of a mobile device. For example, the wireless data transmitting device 1100 and the wireless data receiving device 1200 may be integrated into a mobile terminal including smartphones, smart pads, or tablets, or other types of wireless communication devices, portable computers having wireless communication cards, a personal digital assistant (PDA), a portable media player, a digital image capturing device such as a camera or a camcorder, or other flash memory devices having wireless communication capabilities. In this case, the wireless data transmitting device 1100 and the wireless data receiving device 1200 may be provided in a form of a wireless communication module or chip.

A smartphone user may stream or mirror a video or audio output by a user's smartphone, tablet, or other computer devices to another device such as a television or projector capable of providing a higher resolution display or other enhanced user experiences.

In an aspect, data may include audios, videos, pictures, images, and multimedia, or may be constructed of at least one combination thereof.

In another aspect, the data may include a bit stream of an audio-compressed format, a bit stream of a video-compressed format, a bit stream of a picture-compressed format, and a bit stream of a multimedia-compressed format, or may include at least one combination thereof. In this case, the wireless data transceiving system 1000 may also be referred to as a wireless compressed data stream transceiving system. In addition, the wireless compressed data stream transceiving system 1000 may further include a functional or physical unit for compressing data.

Regarding a detailed structure of each device, the wireless data transmitting device 1100 includes a memory 1120, a processor 1130, a communication circuit 1140, and a plurality of antennas 1150-1, 1150-2, ..., 1150-N$_{Tx}$, and the wireless data receiving device 1200 includes a communication circuit 1210, a memory 1220, a processor 1230, and a plurality of antennas 1250-1, 1250-2, . . . , 1250-N$_{Rx}$.

The memories 1120 and 1220 are operatively coupled to the processors 1130 and 1230, and store a variety of information for operating the processors 1130 and 1230. The memories 1120 and 1220 may include a read-only memory (ROM), a random access memory (RAM), a flash memory, a memory card, a storage medium, and/or other equivalent storage devices.

The processor 1130 may be configured to implement functions, procedures, and/or methods of the wireless data transmitting device 1100 described in each embodiment of the present specification. In addition, the processor 1230 may be configured to implement functions, procedures, and/or methods of the wireless data receiving device 1200 described in each embodiment of the present specification. Layers of the wireless interface protocol may be implemented in the processors 1130 and 1230.

In terms of the display system of FIG. 1, the processor 1130 may be configured to perform a function of the mainframe control unit 130. For example, the processor 1130 may perform an operation of decoding data or the like related to a video, image, picture, audio, and broadcast program input through the demodulation unit 112, the external device interface unit 115, or the storage unit 120, generating a data stream or a bit stream by processing data through various picture/audio processing schemes such as compression or encoding so that the decoded data is transmitted through a wireless channel, and transmitting the generated data stream or bit stream to the display device 200 through the communication circuit 1140.

The processors 1130 and 1230 may include application-specific integrated circuits (ASICs), other chipsets, logic circuits, and/or data processors.

When the embodiment is implemented in software, the techniques explained in the present specification may be implemented with a module (i.e., procedure, function, etc.) for performing the functions explained in the present specification. The module may be stored in the memories 1120 and 1220 and may be performed by the processors 1130 and 2310. The memories 1120 and 1220 may be implemented inside the processors 1130 and 2310, Alternatively, the memories 1120 and 1220 may be implemented outside the processor 2310, and may be coupled to the processors 1130 and 1230 in a communicable manner by using various well-known means.

The communication circuits 1140 and 1210 may include a baseband circuit for processing a radio frequency signal. The communication circuits 1140 and 1210 are operatively coupled to the processors 1130 and 1230 and transmit and/or receive data wirelessly. A communication channel constituted by the communication circuits 1140 and 1210 may be a network communication channel. In this case, the communication circuits 1140 and 1210 may establish a tunneled direct link setup (TDLS) Which is tunneled to avoid or reduce network congestion. The Wi-Fi direct and the TDLS are used to set up relatively short-range communication sessions. A communication channel constituting a radio link 11 may be a communication channel of a relatively short range, or may be a communication channel implemented using a physical channel structure such as Wi-Fi, Bluetooth, or the like which uses various frequencies such as 2.4 GHz, 3.6 GHz, 5 GHz, 60 GHz, or ultra wide band (UWB).

Although techniques disclosed in the present specification may be primarily described in association with a communication protocol such as an IEEE 802.11 series standard, aspects of these techniques may also be compatible with other communication protocols. For example, the communication circuits 1140 and 1210 may be implemented based on various wireless communication schemes, such as short-range wireless communication, e.g., Bluetooth, NFC, and RFID, or a mobile communication network (e.g., 3G, 4G, 5G cellular network, etc.), or may perform communication by using a communication protocol such as the IEEE 802.11 series standard. By way of example and without limitation, wireless communication between the communication circuits 1140 and 1210 may use orthogonal frequency division multiplexing (OFDM) techniques. It is also possible to use various other wireless communication techniques including, but not limited to, time division multiple access (TDMA), frequency division multiple access (FDMA), code division multiple access (CDMA), or any combination of OFDM, FDMA, TDMA and/or CDMA.

Figure 3:
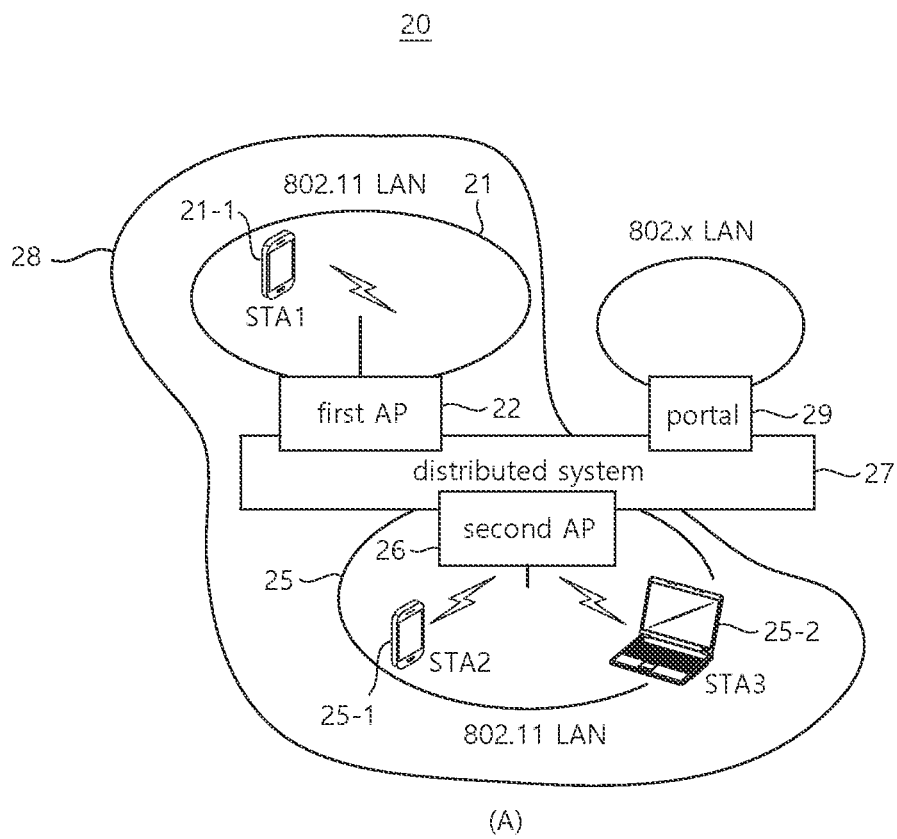
FIG. 3 is a conceptual diagram illustrating a case where a wireless data transceiving system is implemented with an IEEE 802.11 series communication protocol according to an embodiment.
Figure 3:
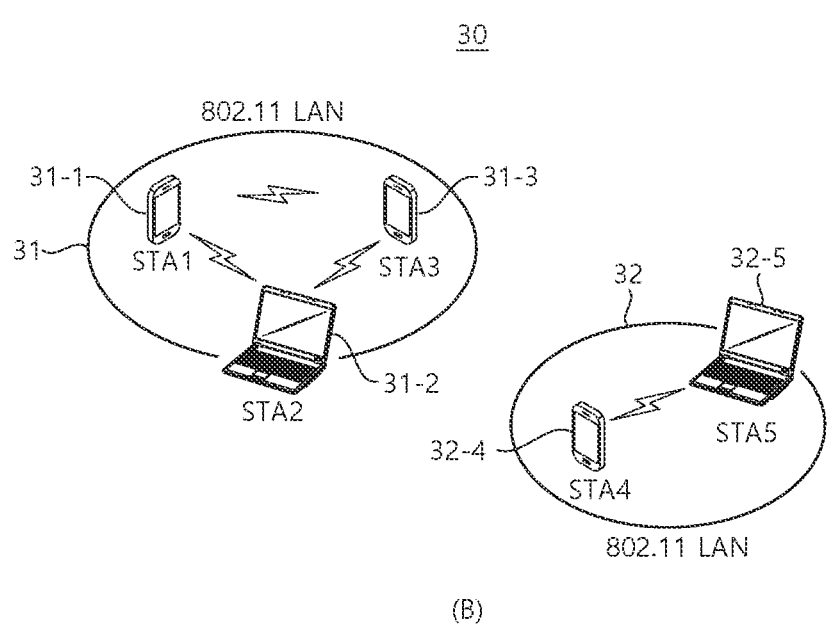

FIG. 3 is a conceptual diagram illustrating a case where a wireless data transceiving system is implemented with an IEEE 802.11 series communication protocol according to an embodiment.

Referring to FIG. 3, a wireless data transceiving system 20 of FIG. 3(A) may include one or more basic service sets (hereinafter, referred to as 'BSSs') 21 and 25. The BSS is a set of access points (hereinafter, APs) and stations (hereinafter, STAs) that can successfully synchronize and communicate with each other and is not a concept indicating a specific region.

For example, the first BSS 21 may include a first AP 22 and one first STA 21-1. The second BSS 25 may include a second AP 26 and one or more STAs 25-1 and 25-2. Herein, the first AP 22 may correspond to the communication circuit 1140 of FIG. 2, and the one or more STAs 25-1 and 25-2 may correspond to the communication circuit 1210 of FIG.

The infrastructure BSSs 21 and 25 may include at least one STA, the APs 22 and 26 providing a distribution service, and a distribution system 27 for connecting the plurality of APs.

The distribution system 27 may connect the plurality of BSSs 22 and 26 to implement an extended service set (hereinafter, 'ESS') 28. The ESS 28 may be used as a term indicating one network to which the one or more APs 22 and 26 are connected through the distribution system 27. At least one AP included in one ESS 28 may have the same service set identification (hereinafter, SSID).

A portal 29 may serve as a bridge for connecting the WLAN network (IEEE 802.11) with another network (e.g., 802.X).

In a WLAN having a structure as shown in FIG. 3(A), a network between the APs 22 and 26 and a network between the APs 22 and 26 and the STAs 21-1, 25-1, and 25-2 may be implemented.

Meanwhile, a wireless data transceiving system 30 of FIG. 3(B) may perform communication by setting a network between STAs without the APs 22 and 26, unlike FIG. 3(A). A network that performs communication by setting a network even between STAs without the APs 22 and 26 is defined to an ad-hoc network or an independent basic service set (hereinafter, 'BSS').

Referring to FIG. 3(B), the wireless data transceiving system 30 is a BSS that operates in an Ad-Hoc mode, i.e., IBSS. Since the IBSS does not include an AP, there is no centralized management entity. Therefore, in the wireless data transceiving system 30, STAs 31-1, 31-2, 31-3, 32-4, and 32-5 are managed in a distributed manner. Herein, the STAs 31-1, 31-2, 31-3, 32-4, and 32-5 may correspond to the communication circuit 1140 or communication circuit 1210 of FIG. 2.

All of the STAs 31-1, 31-2, 31-3, 32-4, and 32-5 of the IBSS may be configured with mobile STAs, and access to a distributed system is not allowed. All STAs of the IBSS form a self-contained network.

The STA described in the present specification is a random function medium including a medium access control (hereinafter. MAC) following a standard of the institute of electrical and electronics engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

Figure 4:
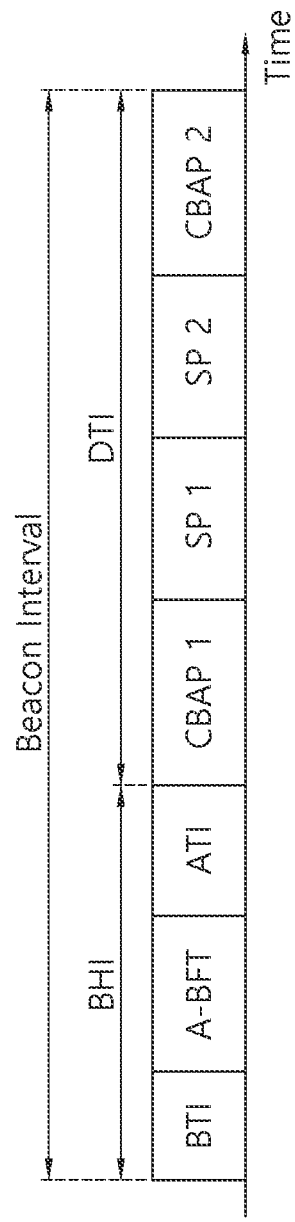
FIG. 4 is a diagram for describing a configuration of a beacon interval according to an embodiment.

FIG. 4 is a diagram for describing a configuration of a beacon interval according to an embodiment.

Referring to FIG. 4, in an enhanced directional multi-gigabit (EDMG) system, a time of media may be divided into beacon intervals. Sub-periods within the beacon interval may be referred to as an access period. Different access periods within one beacon interval may have different access rules. Information on the access period may be transmitted by an AP or a personal basic service set control point (PCP) to a non-AP STA or a non-PCP.

One beacon interval may include one beacon header interval (BHI) and one data transfer interval (DTI). As shown in FIG. 4, the BHI may include a beacon transmission interval (BTI), an association beamforming training (A-BFT), and an announcement transmission interval (ATI).

The BTI refers to a period in which one or more EDMG beacon frames can be transmitted. The A-BFT refers to a period in which beamforming training is performed by an STA which has transmitted the EDMG beacon frame during a preceding BTI. The ATI refers to a management access period based on request-response between the PCP/AP and the non-PCP/non-AP STA.

Meanwhile, a data transfer interval (DTI) is a period in which frame exchange is performed between STAs. One or more contention based access periods (CBAPs) and one or more service periods (SPs) may be allocated as shown in FIG. 4. Although an example in which 2 CBAPs and 2 SPs are allocated is shown in FIG. 4, this is for exemplary purposes only, and the disclosure is not necessarily limited thereto.

Hereinafter, a physical layer configuration for data communication in a wireless AV system to which the present disclosure is applied will be described in detail.

Figure 5:
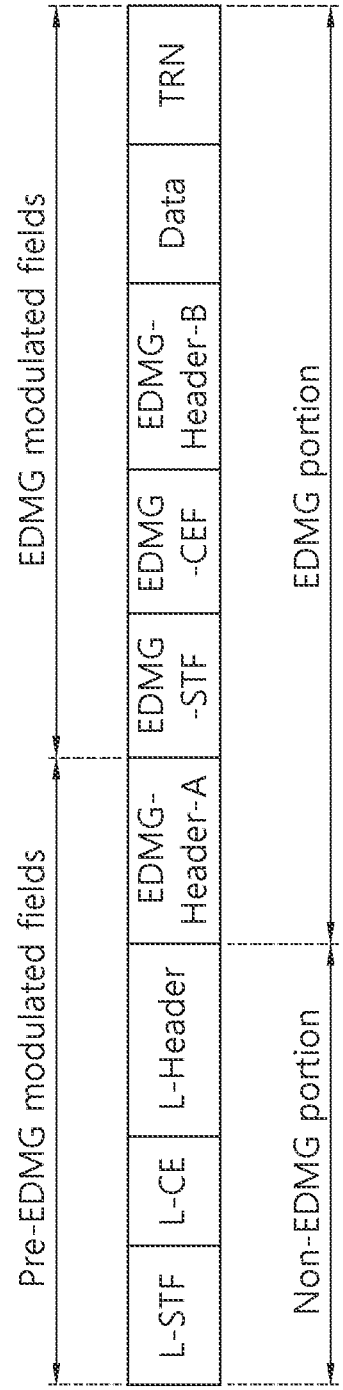
FIG. 5 is a diagram briefly illustrating a configuration of a physical protocol data unit (PPM) frame according to an embodiment.

FIG. 5 is a diagram briefly illustrating a configuration of a physical protocol data unit (PPDU) frame according to an embodiment.

Referring to FIG. 5, the PPDU frame may include a legacy-short training field (L-STF), a legacy-channel estimated field (L-CFF), a legacy-header (L-header), an enhanced directional multi-gigabit-header A (EDMG-header A), an EDMG-STF, an DMG-CEF, an EDMG-header B, data, and TRN. These fields may be selectively included according to a PPDU type (e.g., SU PPDU, MU PPDU, etc.). The L-STF includes a training signal. The L-header may include control information for a first legacy station (e.g., a station supporting IEEE802.11ad). The EDMG-header may include control information for a second legacy station (e.g., a station supporting IEEE802.11ay). The EDMG-STF may include a training signal for the second legacy station.

Herein, control information fields (L-STF, L-CEF, L-header, EDMG header A, EDMG-STF, EDMG-CEF, EDMG-header B) of a physical layer added to a front end of data may be collectively referred to as a preamble. In addition, a part including the L-STF, CHF, and L-header fields may be referred to as a non-EDMG region, and the remaining parts may be referred to as an EDMG region. In addition, the L-STF, L-CEF, L-Header, and EDMG-Header-A fields may be referred to as pre-EDMG modulated fields, and the remaining parts may be referred to as EDMG modulated fields.

Returning to FIG. 2, a MIMO channel 11 may be constructed between the plurality of antennas 1150-1, 1150-2, . . . , 1150-$N_{Tx}$ and the plurality of antennas 1250-1, 1250-2, . . . , 1250-$N_{Rx}$ and data may be transmitted/received through the MIMO channel 11. Herein, each antenna may be referred to as a DMG antenna or an EDMG antenna.

Hereinafter, in order to implement the present specification, a few assumptions may be made. For example, each antenna may be operated by being connected to an individual RF chain. As another example, reciprocity between antennas may be considered.

A communication circuit (1140, 1210) configures a MIMO channel (11), and a wireless data transmitting device (1100) and a wireless data receiving device (1200) transmit and/or receive data through the MIMO channel (11). The communication circuit (1140, 1210) may perform beam-forming (BF) or beamforming training related to MIMO based on multiple antennas (1150-1, 1150-2, . . . , 1150-$N_{Tx}$, 1250-1, 1250-2, . . . , 1250-$N_{Rx}$). The beamforming training relates to transmitting a BF training frame that uses sector sweep and providing necessary signaling to each STA in order to determine an appropriate antenna system setting.

Figure 6:
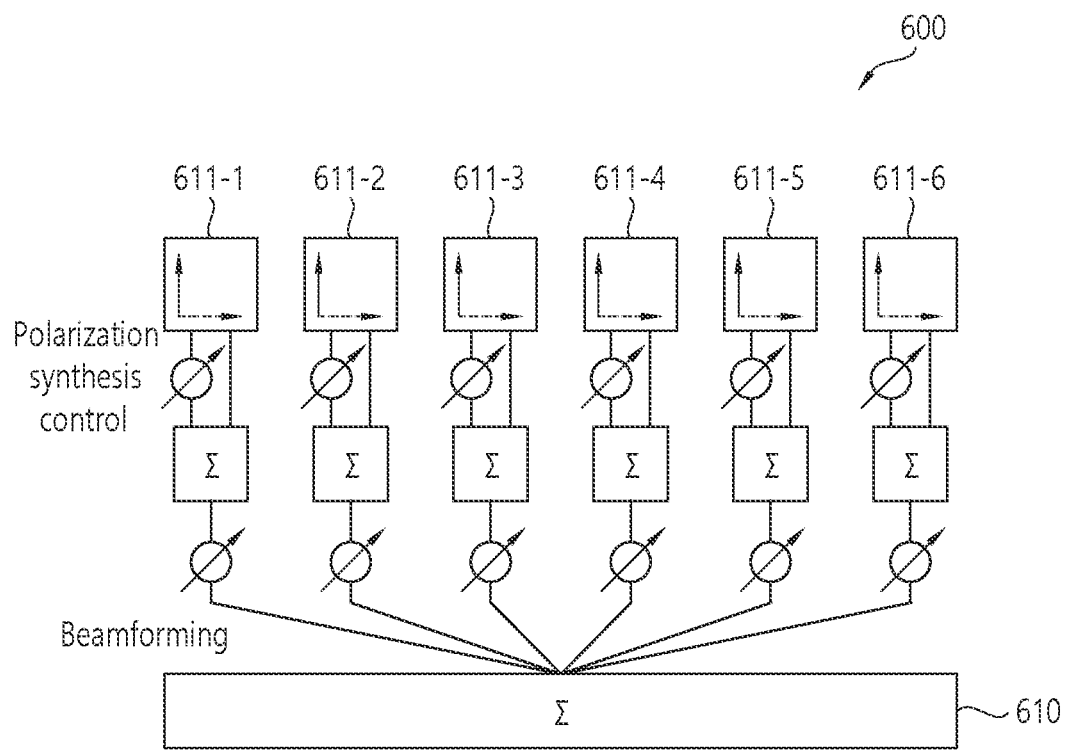
FIG. 6 shows multiple antennas having one RF chain being configured of a dual polarization array according to an embodiment of the present specification.
Figure 6:
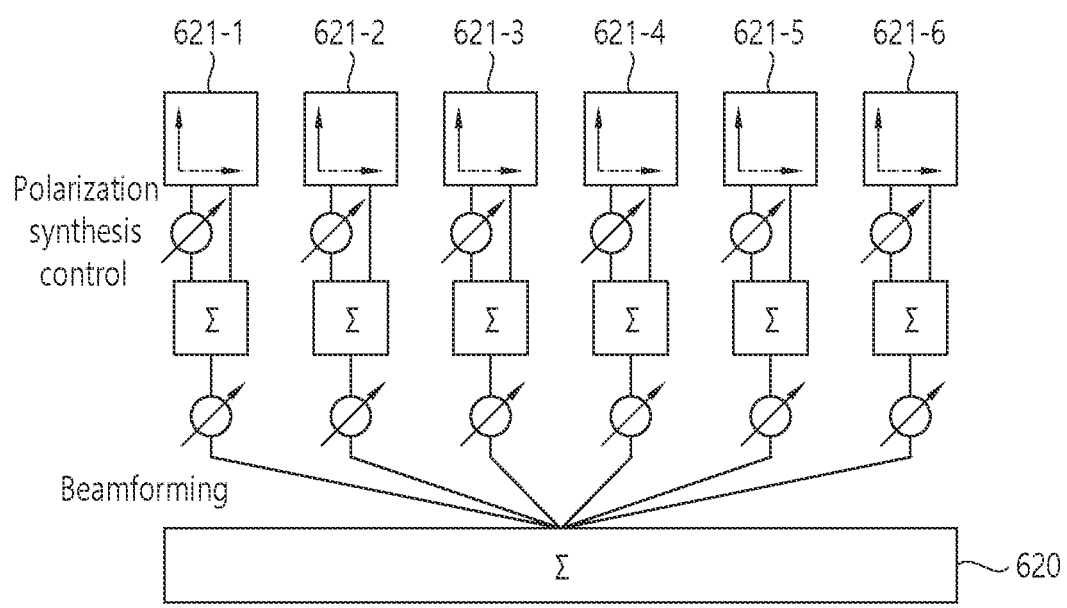

Multiple antennas (1150-1, 1150-2, . . . , 1150-$N_{Tx}$, 1250-1, 1250-2, . . . , 1250-$N_{Rx}$) may be antenna types being capable of performing polarization alignment and may, for example, include a configuration shown in FIG. 6.

FIG. 6 shows multiple antennas having one RF chain being configured of a dual polarization array according to an embodiment of the present specification.

Referring to FIG. 6, for example, multiple antennas (600) include two RF chains (610, 620) and dual polarization arrays (611-1, 611-2, . . . , 611-6, 621-1, 612-2, . . . , 612-6) being connected to each RF chain. One RF chain and a dual polarization array being connected to the one RF chain may be collectively referred to as a DMG antenna or simply referred to as an antenna. That is, a first RF chain (610) and a dual polarization array (611-1, 611-2, . . . , 611-6) being connected thereto may be a first DMG antenna, and a second RF chain (620) and a dual polarization array (621-1, 621-2, . . . , 621-6) being connected thereto may be a second DMG antenna.

A dual polarization array includes multiple dual polarization elements, and a dual polarization element may be referred to as a dual polarization antenna. For example, in linear polarization, the dual polarization element may perform polarization alignment by using poles of two directions, such as a horizontal pole and a vertical pole. Within one dual polarization element, when a signal is transmitted through the horizontal pole, no signal is transmitted through the vertical pole. And, conversely, when a signal is transmitted through the vertical pole no signal is transmitted through the horizontal pole. As another example, in circular polarization, the dual polarization element may perform polarization alignment by using polarizations of two directions, such as a right-hand circular polarization and a left-hand circular polarization. Within one dual polarization element, when a signal is transmitted through the right-hand circular polarization, no signal is transmitted through the left-hand circular polarization. And, conversely, when a signal is transmitted through the left-hand circular polarization, no signal is transmitted through the right-hand circular polarization.

Each dual polarization element is connected to a polarization synthesis controller, and the polarization synthesis controller may control polarization alignment of the dual polarization element. Additionally, each polarization synthesis controller may be connected to a beamforming controller, and the beamforming controller may control beamforming of the dual polarization element. That is, an individual polarization synthesis controller and beamforming controller may be connected to each dual polarization element. The polarization synthesis controller and the beamforming controller may be configured as an integrated controller or module.

Although the present embodiment limits the number of RF chains to two RF chains and limits the number of dual polarization elements to six dual polarization elements, this is merely exemplary. And, therefore, the number of RF chains may be equal to 1 or 2 or more, and the number of dual polarization elements may be smaller or greater than 6.

Figure 7:
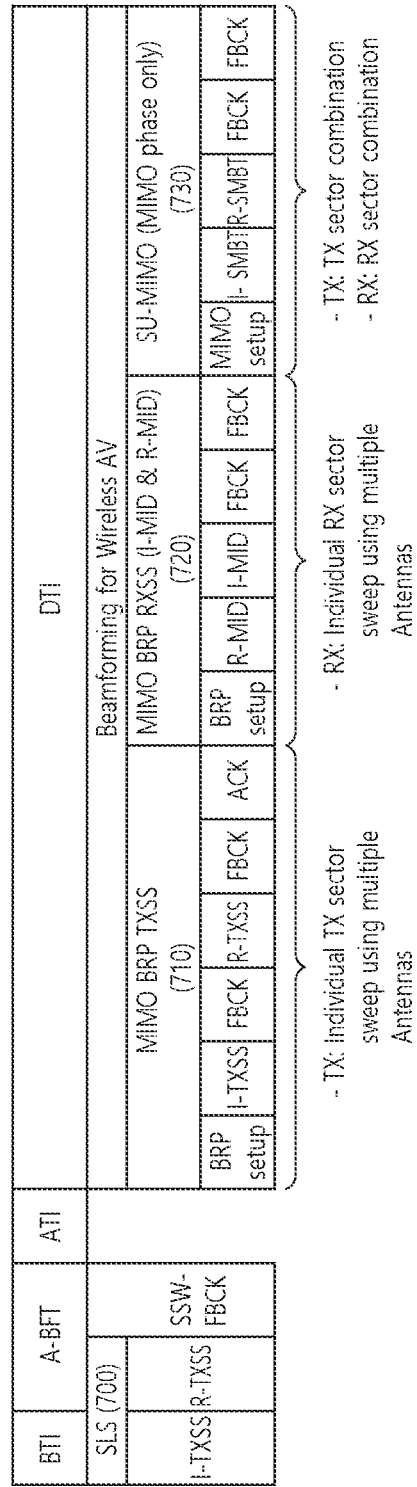
FIG. 7 shows a beam forming training process according to an embodiment of the present specification.

FIG. 7 shows a beamforming training process according to an embodiment of the present specification. This corresponds to an operation of the communication circuit (1140, 1210). Hereinafter, an STA that intends to transmit data through a beamforming operation will be referred to as an initiator, and an STA that receives data from the initiator will be referred to as responder. Additionally, a link from the initiator to the responder will be referred to as an initiator link, and a link from the responder to the initiator will be referred to as a responder link.

Referring to FIG. 7, the BF training process includes a Sector Level Sweep (SLS, 700) process selecting a coarse beam in sector units, and a Beam Refinement Protocol (BRP, 710, 720) process selecting a fine beam. That is the BF training process starts with an SLS from the initiator.

The purpose of the SLS phase (700) is to enable communication between two STAs at a control PHY rate or higher MCS. Most particularly, the SLS phase (700) provides transmitting only BF training. In the SLS phase (700), a coarse transmission direction is determined by using a relatively wide beam. In this phase, a relatively small number of antenna elements may be used. Herein, a transmitter may operate in a Beamforming mode (Directional antenna mode), and a receiver may operate in a Quasi-omni antenna mode. The receiver may receiver a specific signal (e.g., preamble) and may, then, estimate a transmission beam of the transmitter. Therefore, STAs that intend to transmit and/or receive data may mutually know a transmission best sector or reception best sector for an initiator and a responder through the SLS phase (700).

At this point, the SLS phase (700) is a protocol performing link detection in a wireless AV system to which the present specification may be applied, and, herein, by having network nodes contiguously (or consecutively) transmit/ receive frames including performance information of a reception channel link by changing only the beam direction, an indicator indicating an optimal frame, among the successfully received frames, may be a beam training scheme that selects the best beam direction.

A more detailed description of the SLS phase (700) is as follows. The SLS Phase (700) may include Initiator TX Sector Sweep (I-TXSS) for training an initiator link. Responder TX Sector Sweep (R-TXSS) for training a responder link, SSW feedback (FBCK), and SSW ACK.

At this point, the initiator may start the SLS phase (700) by transmitting a frame (or frames) of the I-TXSS. The responder does not start the transmission of a frame (or frames) of the R-TXSS before the I-TXSS is successfully completed. However, a case where the I-TXSS occurs within a BTI may be excluded. The initiator may not start the SSW feedback before the R-TXSS phase is successfully completed. However, a case where the R-TXSS occurs within a A-BFT may be excluded. The responder does not start the SSW ACK of the initiator within the A-BFT. The responder may start the SSW ACK of the initiator immediately after the SSW feedback (FBCK) of the initiator has been successfully completed.

The BF frames being transmitted by the initiator during the SLS phase (700) may include an (EDMG) beacon frame, an SSW frame, and an SSW feedback frame. During the SLS process, the BF frames being transmitted by the responder may include an SSW frame and an SSW-ACK frame.

If each of the initiator and the responder performs TXSS during the SLS phase (700), at the end of the SLS phase (700), each of the initiator and the responder may possess its own transmit sector. If the I-TXSS or R-TXSS employs receive sector sweep, the responder or initiator may possess its own receive sector. An STA does not change its transmission power (or transport power) during sector sweep.

At this point, for example, in the above-described SLS Phase (700), the initiator and the responder may use a Short SSW frame. And, for this, the SSW feedback frame and the SSW ACK frame may need to be defined.

When a request is made by the initiator or responder, a Beam Refinement Protocol (or Beam Refinement Phase) (BRP) may be performed subsequent to the SLS phase (700).

The purpose of the BRP phase is to enable reception (RX) training and to enable iterative refinement of an Antenna Weight Vector (AWV) of all transmitters and receivers within all STAs. If one of the STAs participating in the beam training chooses to use a single transmission (TX) antenna pattern, the RX training may be performed as part of the SLS phase (700).

In the BRP phase, a transmission (TX)/reception (RX) beam combination is precisely determined by using a relatively narrow beam. The BRP phase may include a SISO phase and a MIMO phase. The BRP phase may use a relatively larger number of antenna elements as compared to the SLS phase (700) and may increase precision by iterative performance.

As described above, the SISO phase may be performed as a preceding procedure in order to reduce the load of the MIMO phase. And, therefore, the SISO phase may be optionally included in the BRP phase. In case the SISO phase is omitted (or skipped), the BRP phase may be regarded to be the same as the MIMO phase. And, in this case, the BRP phase may also be referred to as a MIMO phase. In the BRP phase, a status enabling minimum communication, such as transmission of a control packet, beacon, and so on, is established, and an optimal beam between the transmitter and the receiver is determined.

The present embodiment discloses a BRP phase in which the SISO phase is omitted (or skipped) or a MIMO phase.

The BRP TXSS according to the present embodiment may include at least one of MIMO BRP TXSS (710), MIMO BRP RXSS (720), and a SU-MIMO phase (730). That is, the BRP phase or MIMO phase according to the present embodiment may include at least one of MIMO BRP TXSS (710) as a first sub-phase, MIMO BRP RXSS (720) as a second sub-phase, and a SU-MIMO phase (730) as a third sub-phase.

The MIMO BRP TXSS (710) includes performing transmit sector training by having the wireless data transmitting device (1100) independently sweep or transmit a sector in parallel per TX antenna, without performing MIMO BRP TXSS (710) on all transmit sector combinations for multiple TX antennas. And, then, the wireless data transmitting device (1100) obtains transmit sector candidates per antenna. By doing so, time (of the SISO phase during MIMO BF) of the BRP TXSS may be shortened (or reduced).

The MIMO BRP RXSS (720) may provide information for selecting a candidate group of a receive sector combination that is to perform the MIMO phase. And, by doing so, the time of the MIMO phase may be reduced. Just as the MIMO BPR TXSS (710), the MIMO BRP RXSS (720) may include a phase independently performing receive sector training in parallel per RX antenna. And, a receive sector candidate may be derived per antenna through the MIMO BRP RXSS (720).

The SU-MIMO phase (730) includes a phase of deriving a best transmit-receive sector combination, among all of the transmit-receive sector combinations.

Figure 8:
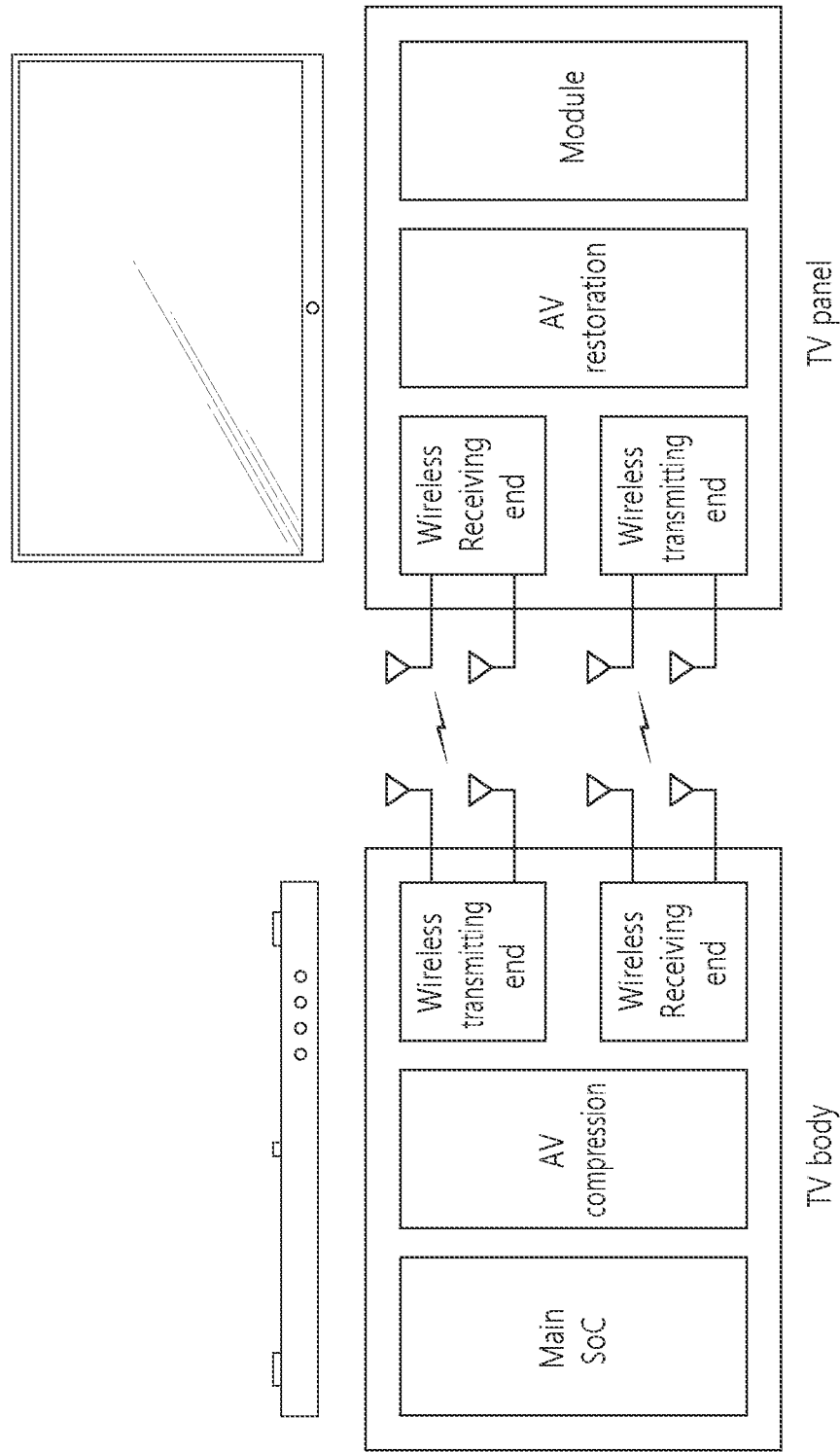
FIG. 8 is a basic block diagram of a TV body and a TV panel.

FIG. 8 is a basic block diagram of a TV body and a TV panel.

Referring to FIG. 8, a signal may be wirelessly transmitted between the TV body and the panel.

In order to lower the required data rate, the TV body and TV panel apply the ratio of ¼, ⅕, ⅙, and ¹⁄₁₀ for image compression and restoration. In order to increase the signal transmission rate, the TV body and the TV panel transmit two streams simultaneously using two antennas at the transmitting and receiving end.

However, in wireless AV transmission, image quality degradation may occur depending on the wireless environment. In order to compensate for the deterioration of image quality due to changes in the wireless environment, priority is set according to the characteristics of image quality data and different MCS (Modulation and Coding Scheme) is applied to the data having the set priority to minimize the deterioration of image quality.

Figure 9:
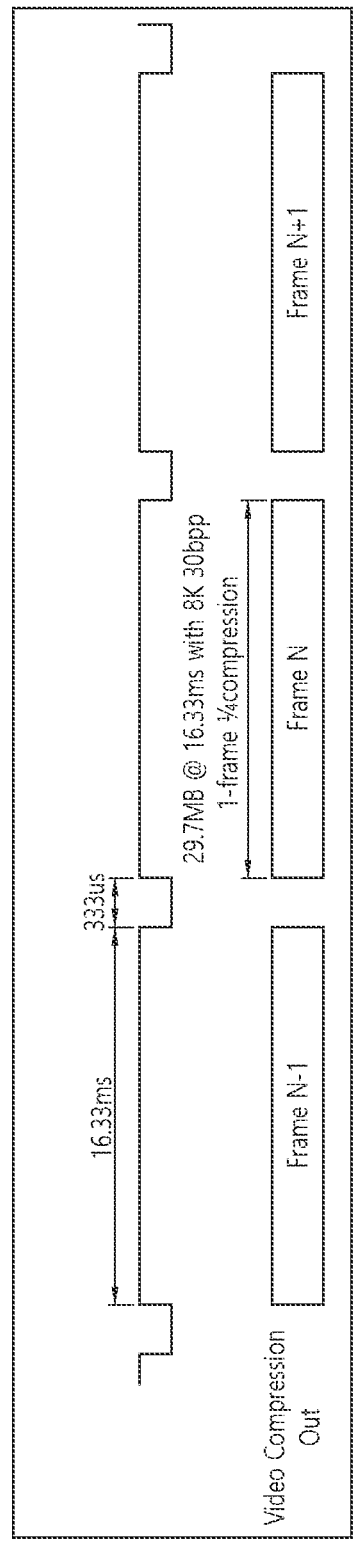
FIG. 9 is a diagram illustrating an output shape of image compression as a time line.

FIG. 9 is a diagram illustrating an output shape of image compression as a time line.

The output shape of the video compression of FIG. 9 assumes a refresh rate of 60 Hz.

The transmission speed of wireless AV should be equal to or faster than the output speed of video compression. Video compression outputs data at 15.23 Gbps based on 8K60p ¼ compression, and data transmission should be performed at the same or faster speed than 15.23 Gbps including retransmission for wireless transmission.

The interface of the wireless AV must have a packet-based data interface.

Video compression has a packet data interface of Vblank units (frames, 29.7 MB).

From the perspective of wireless AV, it is necessary to redefine large packets in frame units into small packets. Currently, the 0.5 ms packet size is being analyzed, and the 0.5 ms packet size may be defined as the Interface Buffer Granularity between video compression and wireless transmission.

In wireless AV transmission, the corresponding 0.5 ms packet is divided again into retransmission units and wireless transmission/reception is performed (retransmission unit is up to 7920 bytes). When data recovery through retransmission fails, invalid data cannot be distinguished into units such as slices, precincts, and packets, which are the standard of a packet segment when viewed from video compression.

Latency is mainly determined by the buffer size between video compression and wireless AV transmission, and is estimated to be at a maximum level of 1 ms. Since the shape of data provided in image compression is transmitted based on Vblank, the shape of data received from image restoration is also provided based on Vblank to which latency is applied.

Figure 10:
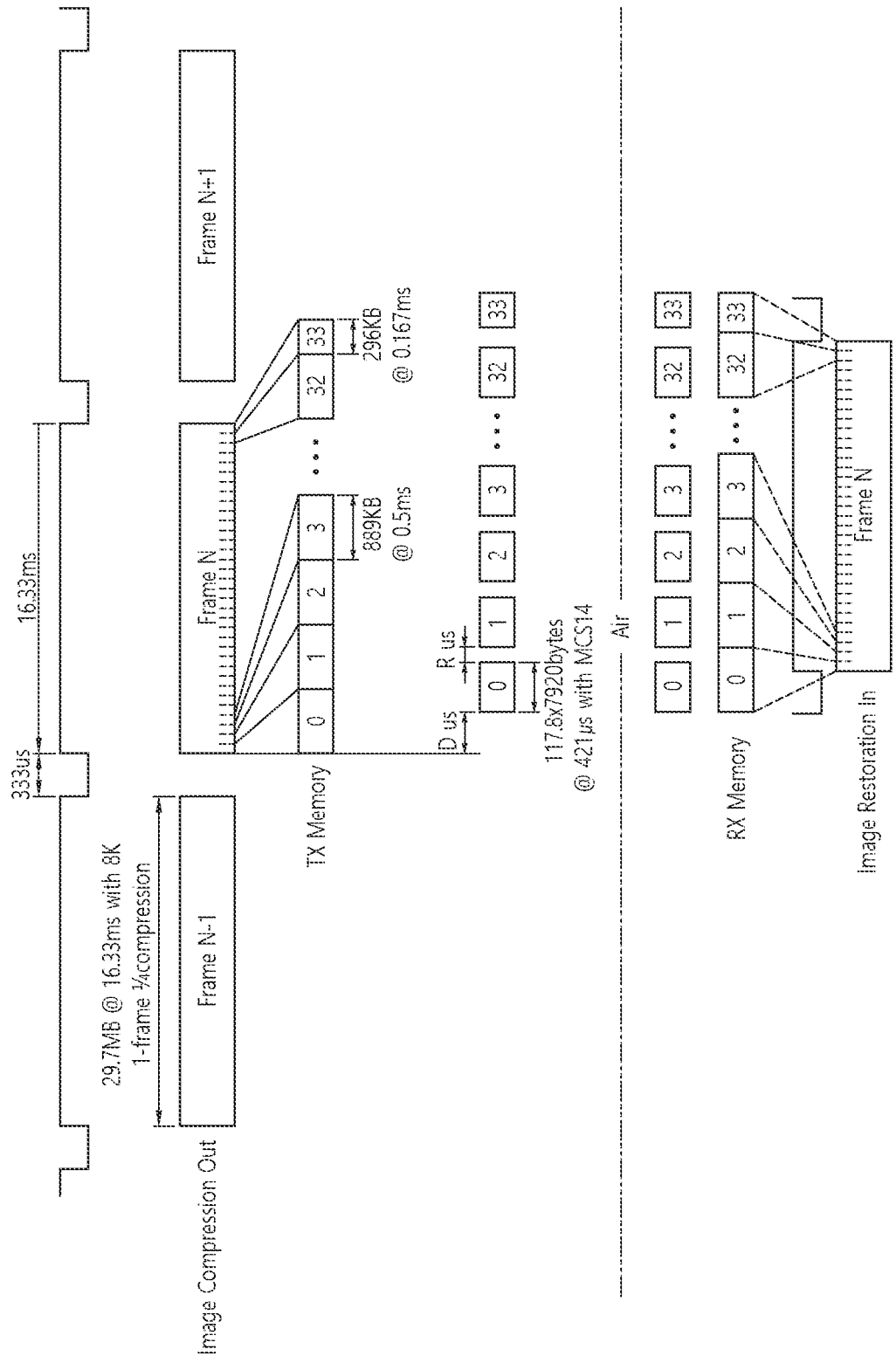
FIG. 10 is a diagram illustrating wireless AV transmission by a timeline.

FIG. 10 is a diagram illustrating wireless AV transmission by a timeline.

Referring to FIG. 10, a frame is transmitted based on a 0.5 ms time slice. The 0.5 ms time slice includes transmission of new data+BlockAck+data retransmission. The transmission of new data can be transmitted for about 420 us.

One frame (e.g., one of frame N−1, frame N, and frame N+1 in FIG. 10) is transmitted for 16.33 ms. One frame has a size of 29.7 MB, and compression of 8K ¼ is applied. Video compression IP is written to the TX memory at a speed of 15.2 Gbps (7680*4320*30*60/4/0.98).

The image-compressed frame is recorded in the TX memory in units of 0.5 ms time slices. At this time, the TX memory has 33 buffered data, and each buffered data has a size of 889 KB and a time of 0.5 ms. The last 33th buffered data has a size of 296 KB and 0.167 ms to match the length of one frame of 16.33 ms.

D us in FIG. 10 is a delay in processing, and the value of D is determined based on the buffer size and the compression and recording speed in the MAC (estimated value is 100 to 500 us). There is a time interval of R us between 0.5 ms time slices, and the value of R is the retransmission and frame exchange interval (estimated value is 80 us). One time slice has a size of 117.8*7920 bytes and has a length of 421 us in case of MCS 14. The wireless AV transmission rate is 17.4 Gbps when MCS 14 is used. That is, it can be seen that the wireless AV transmission speed is faster than the video compression IP speed. The data configuration of one 0.5 ms time slice will be described later with reference to FIG. 11.

When the transmitting end transmits transmission of new data included in the 0.5 ms time slice+BlockAck+data retransmission on air, the receiving end receives it, reads it from the RX memory, and can perform image restoration. Since the read speed of the video restoration IP is 15.2 Gbps, which is slower than the write speed of the MAC, a double buffer is required.

Figure 11:
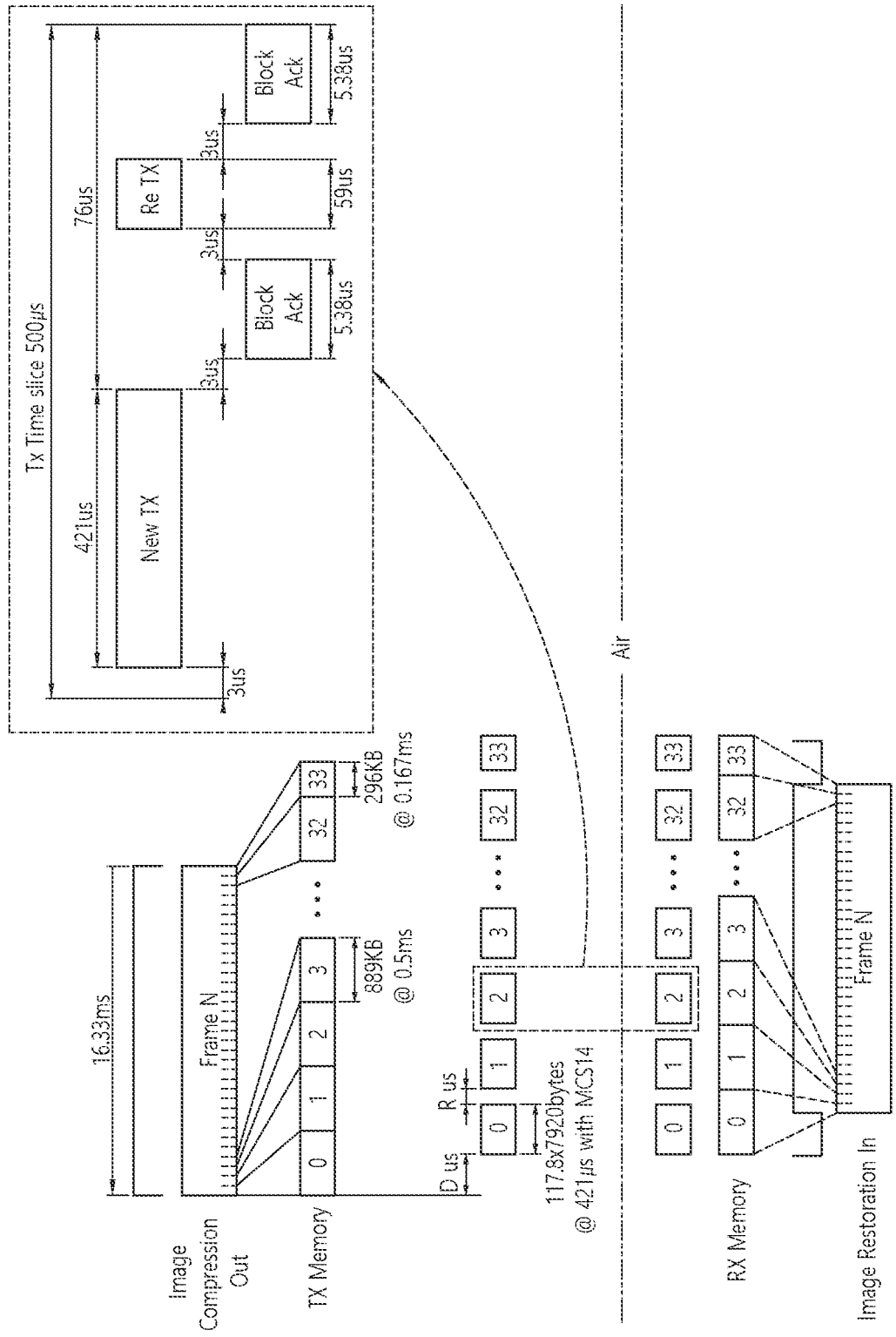
FIG. 11 is a diagram illustrating a data configuration of one 0.5 ms time slice.

FIG. 11 is a diagram illustrating a data configuration of one 0.5 ms time slice.

In one 0.5 ms time slice, the transmission interval of new data is 421 us, the transmission interval of BlockAck for new data is 5.38 us, the data retransmission interval is 59 us, and the transmission interval of BlockAck for data retransmission is 5.38 us. The time interval between each data is 3 us.

However, due to the characteristics of the wireless AV transmission environment, the wireless channel has a static characteristic, and when data loss occurs due to deterioration of the wireless environment, there is a high possibility that the loss will occur continuously for a certain period of time. Therefore, there is a need for a method for minimizing data loss from the point of view of an end user in a wireless environment degradation situation.

In this specification, since image quality is checked with the human eye due to the nature of image quality data, it is divided into important information (human recognizable image information) and less important information (less important information for image quality recognition) according to the type of screen. Using the point, this specification proposes a transmission method that increases the robustness of important data through the application of variable MCS based on data priority.

As an example, a method is proposed in which a transmitting end selects a variable MCS in consideration of a signal quality of service (QoS) and a link condition, and then transmits a signal as an A-PPDU. High QoS signals are transmitted with the lowest possible MCS. The Low QoS signal is transmitted to the MCS that can be transmitted on the link.

Also, the transmitting end may select the MCS. First, a transmitting end monitors a signal to interference plus noise ratio (SINR) situation of a radio link, and selects a requested data rate according to an image compression rate. Then, the MCS of the High QoS signal or the MCS of the Low QoS signal is selected.

In addition, the transmitting end may select a High QoS signal. When the image compression stage compresses, it can be determined by the priority of the signal. In Video/Control/OSD . . . Data, the transmitter can classify High QoS signals according to their importance.

Figure 12:
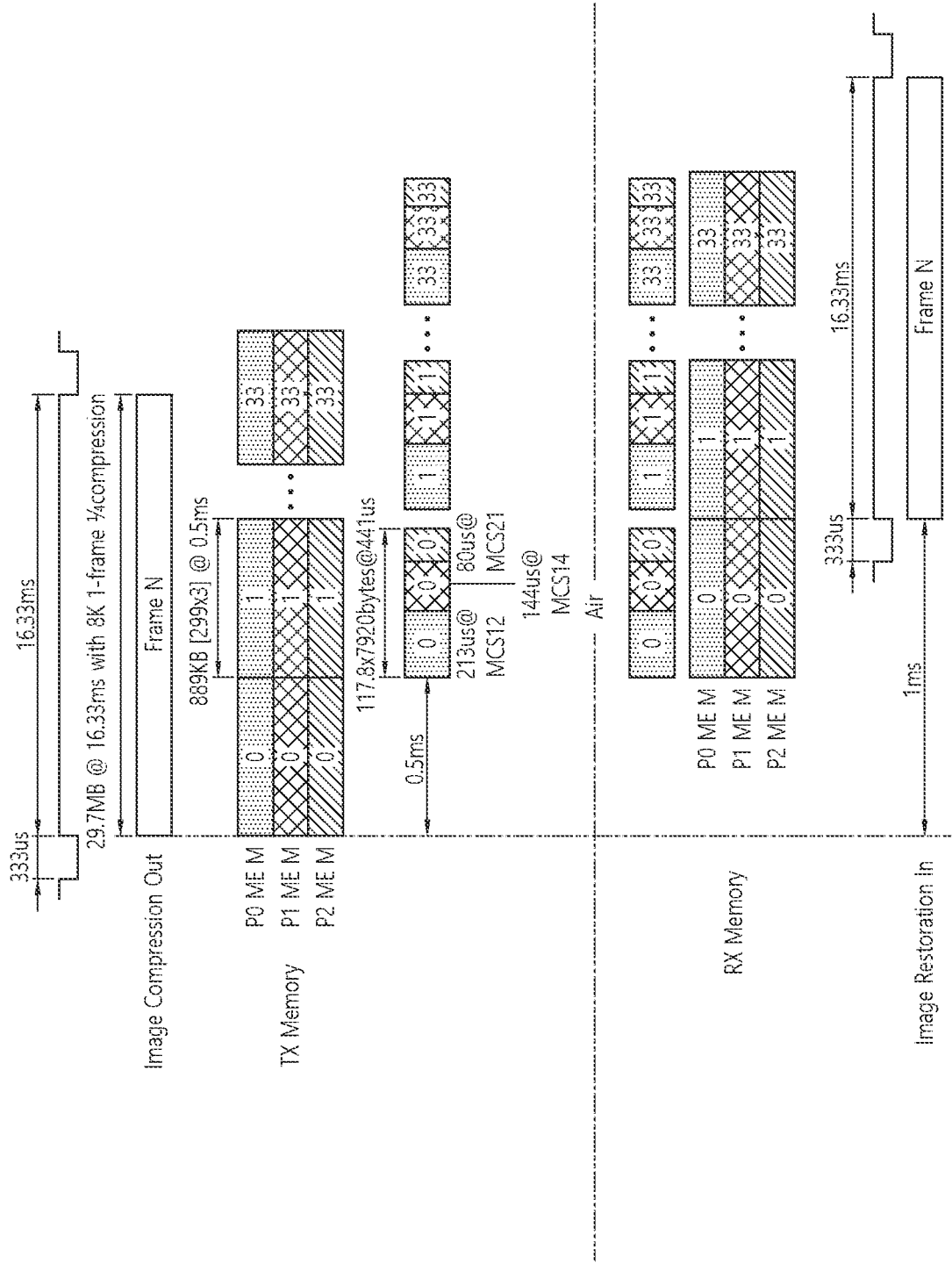
FIG. 12 is a diagram illustrating an example of performing wireless AV transmission based on priority.

FIG. 12 is a diagram illustrating an example of performing wireless AV transmission based on priority.

In FIG. 12, P0, P1, and P2 indicate priorities, and the priorities are high in the order of P0, P1, and P2 (P0>P1>P2). However, it is assumed that the ratios of P0, P1, and P2 of data to be written in image compression are even. That is, in FIG. 12, the memory sizes P0, P1, and P2 are the same. However, when the ratios of P0, P1, and P2 are dynamic, the memory sizes of P0, P1, and P2 may be affected. Each data buffered in the P0, P1, and P2 memories has a size of 889 KB and a time of 0.5 ms.

Data buffered in the TX memory is processed according to priority. In this case, a processing delay of 0.5 ms may occur. Data 0 buffered in P0 memory has a length of 213 us and MCS 12 is applied while processing. Data 0 buffered in the P1 memory has a length of 144 us while being processed and MCS 14 is applied. Data 0 buffered in P2 memory has a length of 80 us while being processed and MCS 21 is applied. The processed data 0 has a size of 117.8*7920 bytes and a length of 441 us.

As in FIG. 10, when the transmitting end transmits transmission of new data included in the processed data according to the priority+BlockAck+data retransmission on the air, the receiving end receives it, reads it from the RX memory, and can perform image restoration. According to FIG. 12, a delay of 1 ms may occur between the image compression output and the image restoration input.

The wireless AV transmission method of FIG. 12 transmits data for same transmission time, but reduces the probability of loss of important data by differentiating data transmission occupied sections according to priorities.

FIG. 13 shows a table for selecting an MCS in consideration of the SINR situation of a radio link.

Referring to FIG. 13, the transmitting end monitors the SINR status of the radio link and selects a requested data rate according to the video compression rate. That is, it is possible to select the MCS of the High QoS signal or the MCS of the Low QoS signal.

For example, when the measured SINR is 20 dB, it may have a data rate of 21.5 Gbps in Light-Of-Sight (LOS) and 9.3 Gbps in Non-Light-Of-Sight (NLOS).

Assuming that the required data rate of 18 Gbps is required for ¼ video compression in the LOS environment and a high priority signal of 10% is assumed, the transmitter selects "0.1x(t_putHigh-priority)+0.9x(t_putLow-priority) >18 Gbps" Choose an MCS that satisfies them. For example, MCS High-priority=2 and MCS Low-priority=18 may be obtained.

Hereinafter, a procedure for selecting an MCS will be described.

The input source is as follows. Compressed data includes video and OSD, and uncompressed data includes audio, PIP and Control. As for the compression rate, a bit per pixel (BPP) of 1 to 8 is supported. Priorities are defined as P0, P1, and P2.

Figure 14:
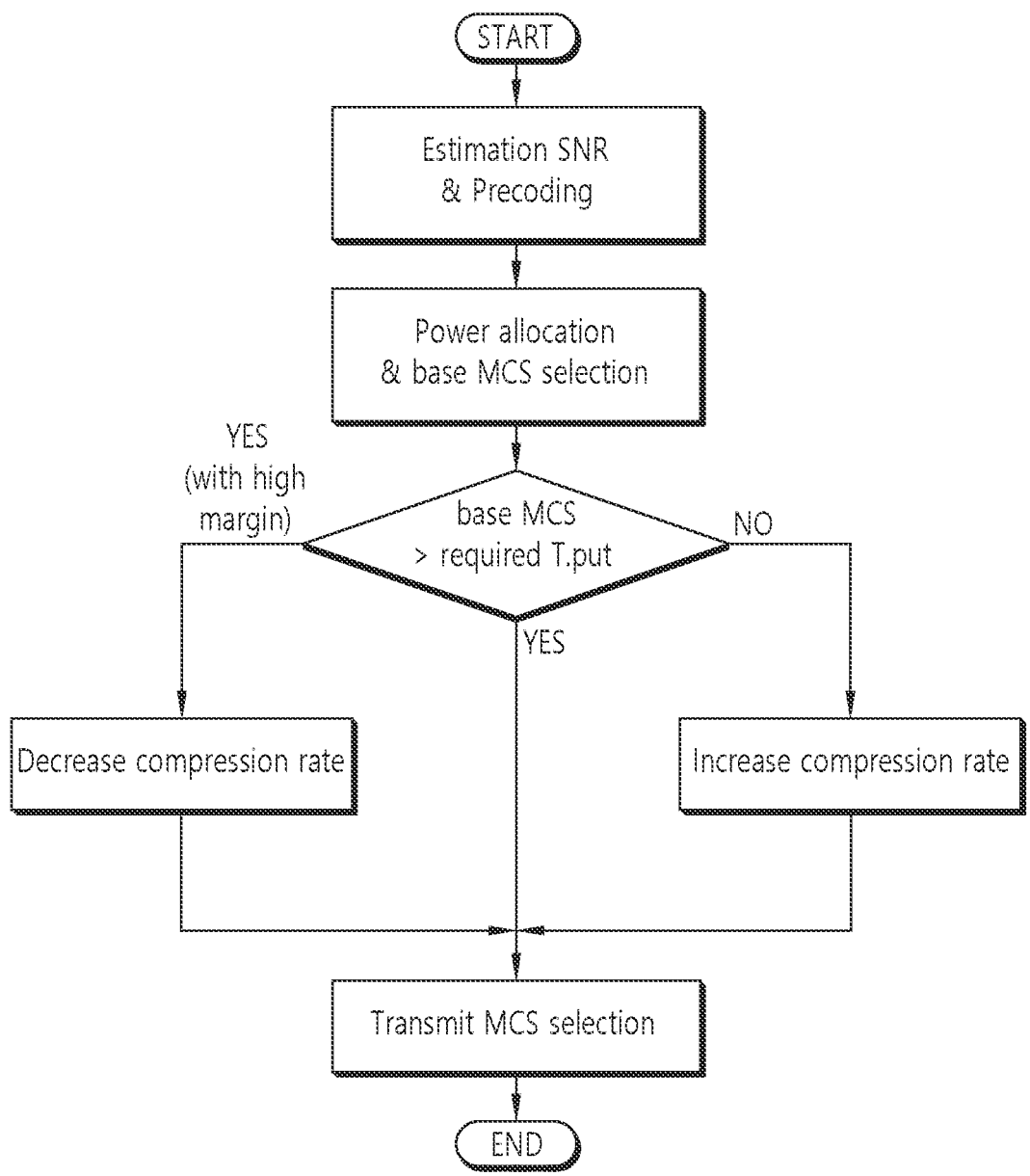
FIG. 14 shows an example of a procedure for selecting an MCS.

FIG. 14 shows an example of a procedure for selecting an MCS.

Referring to FIG. 14 first, a transmitting end measures SNR and performs precoding. Then, the transmitting end selects power allocation and base MCS based on post SNR. The transmitting end compares the estimated throughput (T.put) and the required throughput based on the default MCS. If the measured throughput is less than the required throughput, the transmitting end increases the compression ratio. If the measured throughput is greater than the required throughput, the transmitting end reduces the compression ratio. Thereby, the transmitting end can select the transmission MCS. In this case, P2 is the default MCS, P1 is the default MCS−αj, and P0 is the best effort.

Figure 15:
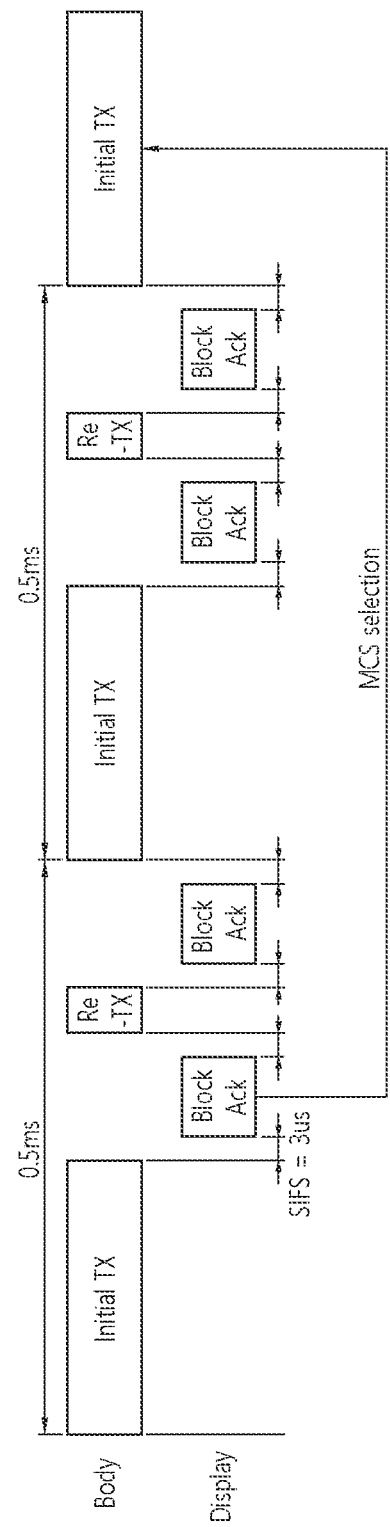
FIG. 15 shows an example of processing time.

FIG. 15 shows an example of processing time.

Referring to FIG. 15, the MCS for the second transmission among the next initial Tx is selected based on the first BlockAck report result.

Hereinafter, parameters for default MCS selection will be described.

The following is an equation for obtaining the measured SNR for MCS j.

$$\bar{\gamma}_j = P_i \gamma_i = P_i \frac{\rho_i}{\sigma_i^2} \quad \text{Required } SNR, \bar{\gamma}_j, \text{ for } MCS\ j \qquad \langle \text{Equation 1}\rangle$$

where
i: stream Index
$\gamma_i$: post SNR
$P_i$: transmit power
$\rho_i$: channel power
$\sigma_i^2$: noise variance
Below is a method to solve the optimization problem when there are two streams.

$$\hat{k} = \max_k \left( \sum_{i=0}^{N_{ss}-1} R(\kappa_i(k)) \right) \text{ subjected to constraint } P_0 + P_1 \leq 2 \qquad \langle \text{Equation 2}\rangle$$

where
R: data rate
$\kappa_j(k)$: k-th set of MOS combinations $$P_0 + P_1 \leq 2 \Longrightarrow \frac{\bar{\gamma}_{\kappa_0(k)} \sigma_0^2}{\rho_0} + \frac{\bar{\gamma}_{\kappa_1(k)} \sigma_1^2}{\rho_1} \leq$$
$$2 \Longrightarrow \bar{\gamma}_{\kappa_0(k)} \sigma_0^2 \rho_1 + \bar{\gamma}_{\kappa_1(k)} \sigma_1^2 \rho_0 \leq 2\rho_0 \rho_1 \qquad \langle \text{Equation 3}\rangle$$

When the MCS combination for each stream (in descending order from the maximum data rate) satisfies the required SNR, the transmitting end selects the corresponding MCS set.

FIG. 16 shows an example of MCS combination for default MCS selection.

Referring to FIG. 16, there are cases in which several MCS combination sets exist at the same data rate, and in this case, a method of selecting an optimal value should be additionally considered.

An example of comparing throughput is as follows.

The measured throughput ($Tput_L$) corresponds to Link_DataRate and has a transmission data rate of 0.5 ms.

The requested throughput ($Tput_{S0}$) corresponds to Source_DataRate and has a required data rate at 0.5 ms. In addition, N source data rates (e.g., video, audio, PIP, OSD, . . . ) may be added as follows.

$$Tput_S = \Sigma_{i=0}^{N} Tput_{Si} \qquad <\text{Equation 4}>$$

Below is the process of comparing throughput.

Figure 17:
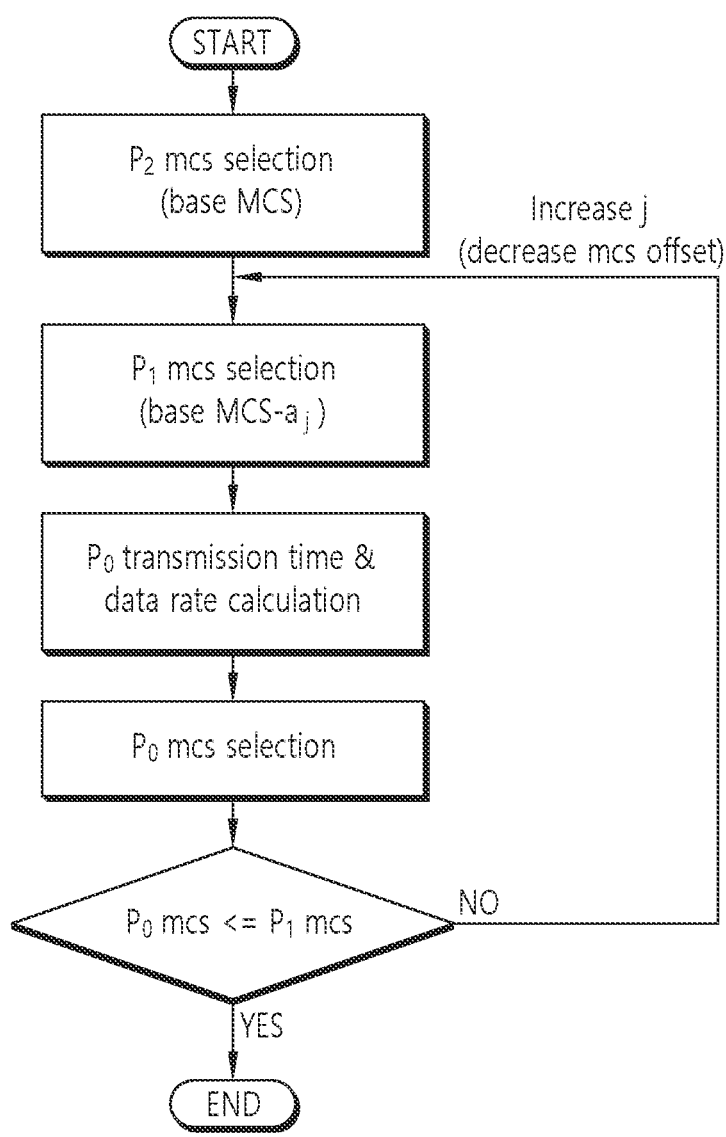
FIG. 17 shows an example of a procedure for selecting an MCS based on a priority.

$Tput_L < Tput_S \times \beta_1$: increase compression rate
$Tput_L > Tput_S \times \beta_2$: decrease compression rate
$\beta_1$ (<1): margin parameter, $\beta_2$ (>1) margin parameter FIG. 17 shows an example of a procedure for selecting an MCS based on a priority First, the transmitting end selects the P2 MCS. P2 is the default MCS. If $Tput_L < Tput_S$, MCS is set to the minimum value of (21 and default MCS+1). In addition, the transmission time of P2 may be measured as follows.

$$Time_{P2} = AmountofSourceData_{P2}/DataRate_{P2}$$

Next, the transmitting end selects the P1 MCS. P1 is the default MCS (P2 MCS)−$\alpha_j$. At this time, $\alpha_0=2$, $\alpha_2=1$. In addition, the transmission time of P1 may be measured as follows.

$$Time_{P1} = AmountofSourceData_{P1}/DataRate_{P1}$$

Next, the transmitting end calculates the P0 transmission time and data rate, and selects the P0 MCS. P0 is best effort. The transmission time of P0 can be calculated as follows.

$$Time_{P0} = floor(DataTime(C) - (Time_{P1} + Time_{P2}), 290.9 \text{ [ns]})$$

The data rate of P0 can be calculated as follows.

$$DataRate_{P0} = AmountofSourceData_{P0}/Time_{P0}$$

The P0 MCS may be selected to be larger than the $DataRate_{P0}$ and smaller than the default MCS−$\alpha_j$. If this is not satisfied, j is incremented and the P1 and P0 calculations can be performed again.

Hereinafter, the above-described embodiment will be described with reference to FIGS. 1 to 17.

Figure 18:
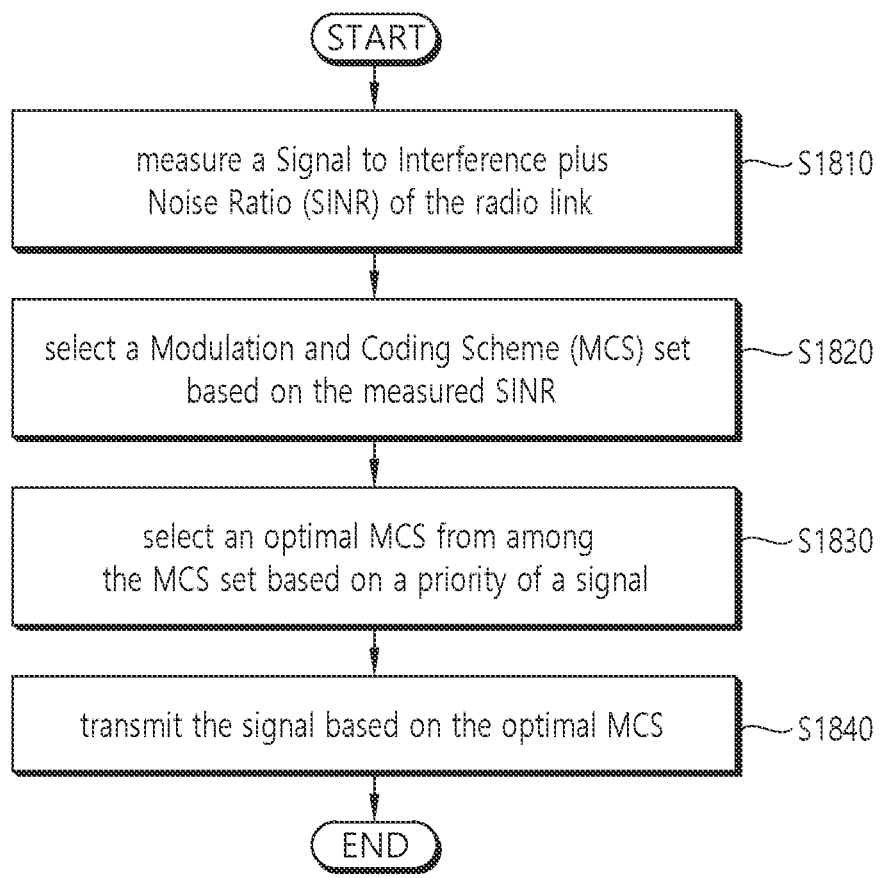
FIG. 18 is a flowchart illustrating a procedure for transmitting a wireless AV signal in the transmitting device according to the present embodiment.

FIG. 18 is a flowchart illustrating a procedure for transmitting a wireless AV signal in the transmitting device according to the present embodiment.

This embodiment proposes a method for compensating for image quality degradation according to a wireless environment in wireless AV (Audio/Video) transmission. Specifically, this embodiment proposes a method of selling priorities according to quality data characteristics and transmitting signals by applying different MCSs according to the set priorities. Accordingly, it is possible to minimize the deterioration of image quality.

The transmitting device may be a TV body, and the receiving device may be a TV panel. That is, this embodiment describes wireless AV transmission between the TV body and the TV panel.

The transmitting device and the receiving device may include a memory, a communication circuit forming a radio link, and a processor controlling the memory and the communication circuit. The processor may perform the following operations.

In S1810 step, the processor measures a Signal to Interference plus Noise Ratio (SINK) of the radio link.

In S1820 step, the processor selects a Modulation and Coding Scheme (MCS) set based on the measured SINR.

In S1830 step, the processor selects an optimal MCS from among the MCS set based on a priority of the signal.

In S1840 step, the processor transmits the signal based on the optimal MCS.

The priority of the signal may be determined based on a Quality of Service (QoS). A signal with a high QoS may be transmitted based on a first MCS, a signal with a low QoS may be transmitted based on a second MCS.

The first MCS may be set to the lowest MCS among the MCS set. The second MCS may be set to a transmittable MCS in the radio link. That is, the processor may select a variable MCS based on the QoS of the signal.

The QoS may be determined based on an importance of the signal during video compression, The signal may be included in one frame, The signal may include first to third data based on the priority, The first to third data may be buffered in the memory at an even ratio, The first to third data may be processed by the processor, The processed first to third data may have a differential transmission interval based on the priority.

For example, a priority (PU) of the first data may be higher than a priority (P1) of the second data, the priority (P1) of the second data may be higher than a priority (P2) of the third data (P0>P1>P2).

Accordingly, a transmission interval of the first data may be longer than a transmission interval of the second data, and the transmission interval of the second data may be longer than a transmission interval of the third data. Accordingly, it is possible to reduce the probability of loss of important data by increasing the transmission period of high-priority data.

The one frame may be subjected to ¼ ratio image compression. A unit of the image compression may be 29.7 MB. A length of the one frame may be 16.33 ms. An output speed of the one frame to which the image compression is applied may be 15.23 Gbps. The signal transmission speed of the wireless AV system should be equal to or faster than the image compression output speed.

The first to third data may include initial data, block ack (BA) for initial data, retransmission data and BA for retransmission data. The first to third data are transmitted for 0.5 ms.

Since a length of one frame is 16.33 ms, the first to third data may be transmitted 33 times. In this case, the first to third data may be generated as an Aggregated-Physical Protocol Data Unit (A-PPDU).

The processor may select a requested data rate in a light of sight (LOS) environment and a non light of sight (NLOS) environment based on the measured SINR and an image compression rate. In this case, the optimal MCS is selected based on the selected requested data rate.

Figure 19:
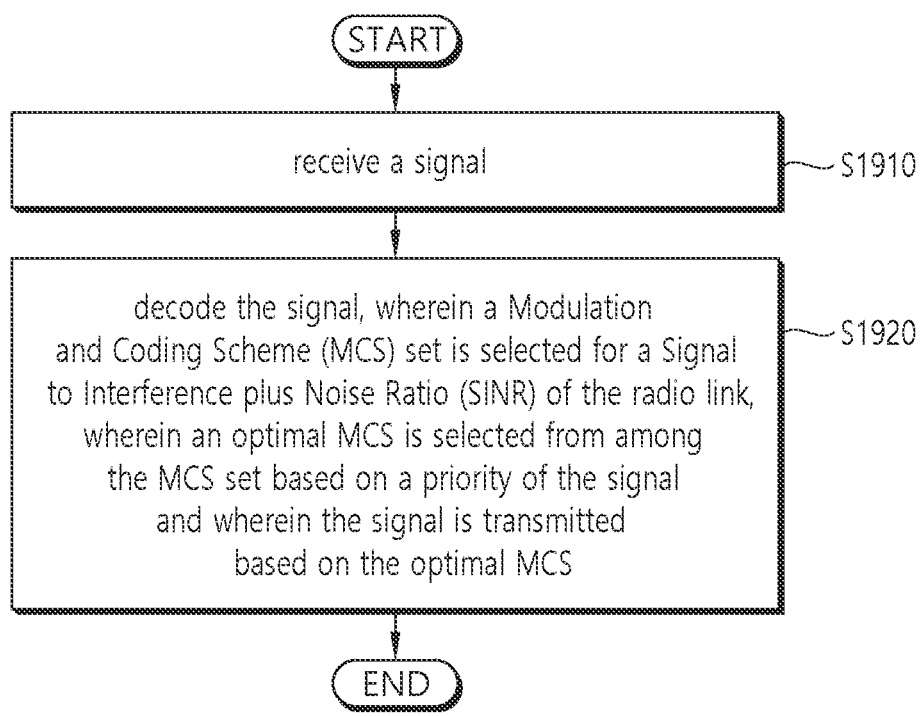
FIG. 19 is a flowchart illustrating a procedure for receiving a wireless AV signal in the receiving device according to the present embodiment.

FIG. 19 is a flowchart illustrating a procedure for receiving a wireless AV signal in the receiving device according to the present embodiment.

This embodiment proposes a method for compensating for image quality degradation according to a wireless environment in wireless AV (Audio/Video) transmission. Specifically, this embodiment proposes a method of setting priorities according to quality data characteristics and transmitting signals by applying different MCSs according to the set priorities. Accordingly, it is possible to minimize the deterioration of image quality.

The transmitting device may be a TV body, and the receiving device may be a TV panel. That is, this embodiment describes wireless AV transmission between the TV body and the TV panel.

The transmitting device and the receiving device may include a memory, a communication circuit forming a radio link, and a processor controlling the memory and the communication circuit. The processor may perform the Mowing operations.

In S1910 step, the processor receives a signal from a transmitting device.

In S1920 step, the processor decodes the signal.

A Modulation and Coding Scheme (MCS) set is selected for a Signal to interference plus Noise Ratio (SINR) of the radio link.

An optimal MCS is selected from among the MCS set based on a priority of the signal.

The signal is transmitted based on the optimal MCS.

The priority of the signal may be determined based on a Quality of Service (QoS). A signal with a high QoS may be transmitted based on a first MCS, a signal with a low QoS may be transmitted based on a second MCS.

The first MCS may be set to the lowest MCS among the MCS set. The second MCS may be set to a transmittable MCS in the radio link. That is, the processor may select a variable MCS based on the QoS of the signal.

The QoS may be determined based on an importance of the signal during video compression, The signal may be included in one frame, The signal may include first to third data based on the priority, The first to third data may be buffered in the memory at an even ratio, The first to third data may be processed by the processor, The processed first to third data may have a differential transmission interval based on the priority.

For example, a priority (P0) of the first data may be higher than a priority (P1) of the second data, the priority (P1) of the second data may be higher than a priority (P2) of the third data (P0>P1>P2).

Accordingly, a transmission interval of the first data may be longer than a transmission interval of the second data, and the transmission interval of the second data may be longer than a transmission interval of the third data. Accordingly, it is possible to reduce the probability of loss of important data by increasing the transmission period of high-priority data.

The one frame may be subjected to ¼ ratio image compression. A unit of the image compression may be 29.7 MB. A length of the one frame may be 16.33 ms. An output speed of the one frame to which the image compression is applied may be 15.23 Gbps. The signal transmission speed of the wireless AV system should be equal to or faster than the image compression output speed.

The first to third data may include initial data, block ack (BA) for initial data, retransmission data and BA for retransmission data. The first to third data are transmitted for 0.5 ms.

Since a length of one frame is 16.33 ms, the first to third data may be transmitted 33 times. In this case, the first to third data may be generated as an Aggregated-Physical Protocol Data Unit (A-PPDU).

The processor may select a requested data rate in a light of sight (LOS) environment and a non light of sight (NLOS) environment based on the measured SINK and an image compression rate. In this case, the optimal MCS is selected based on the selected requested data rate.

Since the wireless data receiving apparatus and method, or the transmitting apparatus and method, all components or steps according to the embodiment of the present disclosure described above are not essential, an apparatus and method for receiving wireless data, or an apparatus and method for transmitting data, may be performed by including some or all of the above-described components or steps. In addition, the above-described wireless data receiving apparatus and method, or the embodiment of the transmitting apparatus and method may be performed in combination with each other. In addition, each of the above-described components or steps does not necessarily have to be performed in the order described, and it is also possible that the steps described later are performed before the steps described earlier.

The above description is merely illustrative of the technical spirit of the present disclosure, and various modifications and variations will be possible without departing from the essential characteristics of the present disclosure by those skilled in the art to which the present disclosure pertains. Accordingly, the embodiments of the present disclosure described above may be implemented separately or in combination with each other.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function.

The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image. AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method, in addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A transmitting device in a wireless audio/video (AV) system, the transmitting device comprising:
    a memory;
    a communication circuit forming a radio link; and
    a processor for controlling the memory and the communication circuit, wherein the processor is configured to:
    measure a Signal to Interference plus Noise Ratio (SINR) of the radio link;
    select a Modulation and Coding Scheme (MCS) set based on the measured SINR;
    select an optimal MCS from among the MCS set based on a priority of a signal; and
    transmit the signal based on the optimal MCS,
    wherein the priority of the signal is determined based on a Quality of Service (Qos),
    wherein a signal with a high QoS is transmitted based on a first MCS,
    wherein a signal with a low QoS is transmitted based on a second MCS,
    wherein the first MCS is set to the lowest MCS among the MCS set, and
    wherein the second MCS is set to a transmittable MCS in the radio link.

2. The transmitting device of claim 1, wherein the QoS is determined based on an importance of the signal during video compression,
    wherein the signal is included in one frame,
    wherein the signal includes first to third data based on the priority,
    wherein the first to third data are buffered in the memory at an even ratio,
    wherein the first to third data are processed by the processor, and
    wherein the processed first to third data have a differential transmission interval based on the priority.

3. The transmitting device of claim 2, wherein a priority of the first data is higher than a priority of the second data,
    wherein the priority of the second data is higher than a priority of the third data,
    wherein a transmission interval of the first data is longer than a transmission interval of the second data, and;
    wherein the transmission interval of the second data is longer than a transmission interval of the third data.

4. The transmitting device of claim 2, wherein the one frame is subjected to ¼ ratio image compression,
    wherein a unit of the image compression is 29.7 MB,
    wherein a length of the one frame is 16.33 ms, and
    wherein an output speed of the one frame to which the image compression is applied is 15.23 Gbps.

5. The transmitting device of claim 2, wherein the first to third data include initial data, block ack (BA) for initial data, retransmission data and BA for retransmission data, and
    wherein the first to third data are transmitted for 0.5 ms.

6. The transmitting device of claim 1, wherein the processor selects a requested data rate in a light of sight (LOS) environment and a non light of sight (NLOS) environment based on the measured SINR and an image compression rate, and
    wherein the optimal MCS is selected based on the selected requested data rate.

7. A receiving device in a wireless audio/video (AV) system, the receiving device comprising:

a memory;

a communication circuit forming a radio link; and a processor for controlling the memory and the communication circuit, wherein the processor is configured to:

receive a signal from a transmitting device; and decode the signal, wherein a Modulation and Coding Scheme (MCS) set is selected for a Signal to Interference plus Noise Ratio (SINR) of the radio link, wherein an optimal MCS is selected from among the MCS set based on a priority of the signal, wherein the signal is transmitted based on the optimal MCS, wherein the priority of the signal is determined based on a Quality of Service (Qos), wherein a signal with a high QoS is transmitted based on a first MCS, wherein a signal with a low QoS is transmitted based on a second MCS, wherein the first MCS is set to the lowest MCS among the MCS set, and wherein the second MCS is set to a transmittable MCS in the radio link.

8. The receiving device of claim 7, wherein the QoS is determined based on an importance of the signal during video compression, wherein the signal is included in one frame, wherein the signal includes first to third data based on the priority, wherein the first to third data are buffered in the memory at an even ratio, wherein the first to third data are processed by the processor, and wherein the processed first to third data have a differential transmission interval based on the priority.

9. The receiving device of claim 8, wherein a priority of the first data is higher than a priority of the second data, wherein the priority of the second data is higher than a priority of the third data, wherein a transmission interval of the first data is longer than a transmission interval of the second data, and wherein the transmission interval of the second data is longer than a transmission interval of the third data.

10. The receiving device of claim 8, wherein the one frame is subjected to ¼ ratio image compression, wherein a unit of the image compression is 29.7 MB, wherein a length of the one frame is 16.33 ms, and wherein an output speed of the one frame to which the image compression is applied is 15.23 Gbps.

11. The receiving device of claim 8, wherein the first to third data include initial data, block ack (BA) for initial data, retransmission data and BA for retransmission data, and wherein the first to third data are transmitted for 0.5 ms.

12. A method in a wireless audio/video (AV) system, the method comprising:

measuring, by a transmitting device, a Signal to Interference plus Noise Ratio (SINR) of a radio link;

selecting, by the transmitting device, a Modulation and Coding Scheme (MCS) set based on the measured SINR;

selecting, by the transmitting device, an optimal MCS from among the MCS set based on a priority of a signal; and transmitting, by the transmitting device, the signal based on the optimal MCS, wherein the priority of the signal is determined based on a Quality of Service (Qos), wherein a signal with a high QoS is transmitted based on a first MCS, wherein a signal with a low QoS is transmitted based on a second MCS, wherein the first MCS is set to the lowest MCS among the MCS set, and wherein the second MCS is set to a transmittable MCS in the radio link.

13. The method of claim 12, wherein the QOS is determined based on an importance of the signal during video compression, wherein the signal is included in one frame, wherein the signal includes first to third data based on the priority, wherein the first to third data are buffered in a memory of the transmitting device at an even ratio, wherein the first to third data are processed by a processor of the transmitting device, and wherein the processed first to third data have a differential transmission interval based on the priority.

14. The method of claim 12, wherein a requested data rate in a light of sight (LOS) environment and a non light of sight (NLOS) environment is selected based on the measured SINR and an image compression rate, and wherein the optimal MCS is selected based on the selected requested data rate.

* * * * *